(12) United States Patent
Sasaki et al.

(10) Patent No.: US 7,844,134 B2
(45) Date of Patent: Nov. 30, 2010

(54) IMAGE PROCESSOR AND CAMERA SYSTEM FOR CORRECTING IMAGE DISTORTION

(75) Inventors: Gen Sasaki, Osaka (JP); Yusuke Nara, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 1040 days.

(21) Appl. No.: 11/560,614

(22) Filed: Nov. 16, 2006

(65) Prior Publication Data
US 2007/0120997 A1    May 31, 2007

(30) Foreign Application Priority Data
Nov. 21, 2005    (JP)    ............... 2005-335553

(51) Int. Cl.
  G06K 9/32    (2006.01)
  G06K 9/40    (2006.01)
  G06K 9/00    (2006.01)
  H04N 5/228   (2006.01)
(52) U.S. Cl. ............... 382/295; 382/107; 382/275; 348/222.1
(58) Field of Classification Search ........... 382/295
    See application file for complete search history.

(56) References Cited
U.S. PATENT DOCUMENTS

2004/0218062 A1* 11/2004 Silverstein et al. ....... 348/222.1
2004/0223075 A1* 11/2004 Furlan et al. ............. 348/363
2004/0246344 A1* 12/2004 Voss et al. ............. 348/220.1
2005/0190274 A1*  9/2005 Yoshikawa et al. ..... 348/231.99
2005/0253940 A1* 11/2005 Chiba et al. ............. 348/247

FOREIGN PATENT DOCUMENTS

JP    2006-148496    6/2006
JP    2007-110528    4/2007

OTHER PUBLICATIONS

Geyer et al., Geometric Models of Rolling-Shutter Cameras, in Proc. of the 6th Workshop on Omnidirectional Vision, Camera Networks, and Non-Classical Cameras, Beijing, China, Oct. 2005.*

* cited by examiner

*Primary Examiner*—Bhavesh M Mehta
*Assistant Examiner*—David P Rashid
(74) *Attorney, Agent, or Firm*—Oblon, Spivak, McClelland, Maier & Neustadt, L.L.P.

(57) ABSTRACT

A motion detecting part detects moving regions in a plurality of frame images captured by rolling shutter type exposure, and obtains a motion vector of the moving regions. A moving region correcting part corrects the moving region in a to-be-corrected frame image of the plurality of frame images on the basis of the motion vector, information on an image-capturing time interval between the plurality of frame images, information on an exposure starting time difference resulting from the difference in position in one frame image caused by the rolling shutter type exposure and information on an exposure start sequence depending on the position in one frame image captured by the rolling shutter type exposure.

7 Claims, 20 Drawing Sheets

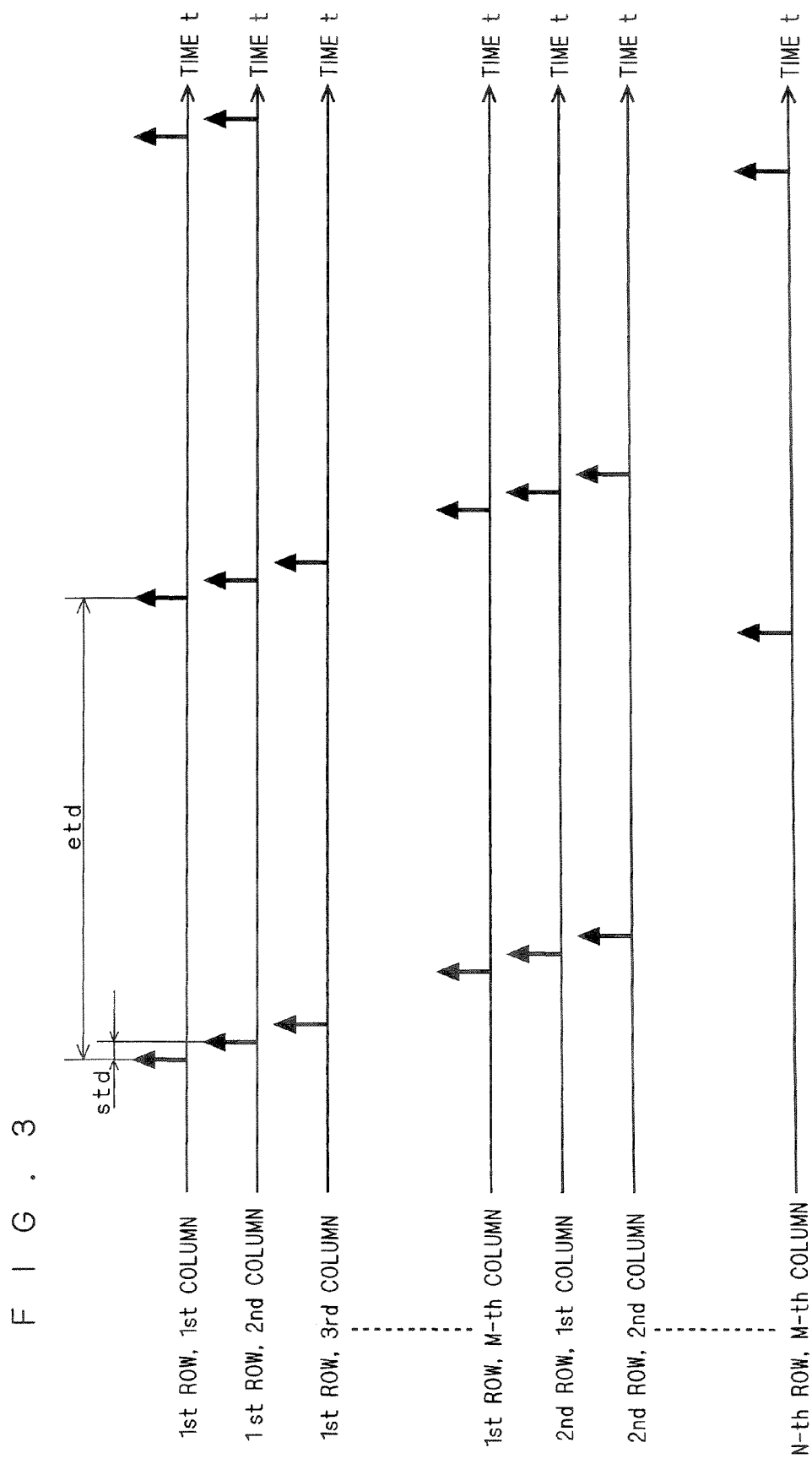

FIG. 10

IMAGE PROCESSOR AND CAMERA SYSTEM FOR CORRECTING IMAGE DISTORTION

BACKGROUND OF THE INVENTION

1. Field of the Invention

The present invention relates to an image processor for carrying out image processing on an image captured by rolling shutter type exposure, and also relates to a camera system equipped with such image processor.

2. Description of the Background Art

Conventionally known exposure techniques for capturing images are of global shutter type and rolling shutter type (also called "focal plane shutter type"). A global-shutter-type image capturing apparatus represented by an image capturing apparatus equipped with CCD (Charge Coupled Device) sensors provides almost the same exposure time period and exposure starting time for each pixel in one frame image. In contrast, a rolling-shutter-type image capturing apparatus represented by an image capturing apparatus equipped with CMOS sensors provides the same exposure time period but different exposure starting time for each pixel or each line of pixels in one frame image.

Since the rolling-shutter-type image capturing apparatus provides a different exposure starting time for each pixel or each line of pixels in one frame image as described above, capturing an image of a moving subject with that image capturing apparatus may cause a distortion in an image of that subject. Even when capturing a stationary subject with the rolling-shutter-type image capturing apparatus, a distortion may similarly occur because of hand shake of a user.

SUMMARY OF THE INVENTION

It is an object of the present invention to provide a technique capable of appropriately correcting an image distortion caused by the rolling shutter type exposure.

An image processor according to the present invention comprises: a motion detecting part configured to detect a moving region in each of a plurality of frame images captured by rolling shutter type exposure to obtain a motion vector of the moving region; and a moving-region correcting part configured to correct the moving region in a to-be-corrected frame image of the plurality of frame images on the basis of the motion vector, image-capturing-time-interval information on an image-capturing time interval between the plurality of frame images, exposure-starting-time-difference information on an exposure starting time difference resulting from the difference in position in one frame image caused by the rolling shutter type exposure and exposure-start-sequence information on an exposure start sequence depending on the position in one frame image captured by the rolling shutter type exposure.

According to a first aspect of the invention, the moving-region correcting part: obtains a moving speed of the moving region between the plurality of frame images on the basis of the motion vector and the image-capturing-time-interval information; determines a correction amount for each of pixels in the moving region in the to-be-corrected frame image on the basis of the moving speed, the exposure-starting-time-difference information and the exposure-start-sequence information; and shifts the each of pixels in the moving region in the to-be-corrected frame image in an opposite direction to a direction indicated by the motion vector by the correction amount, to thereby use the each pixel instead of a pixel present in a destination pixel position.

The moving region in the to-be-corrected frame image is corrected on the basis of the detected motion vector of the moving region, information on an image-capturing time interval between the plurality of frame images, information on an exposure starting time difference resulting from the difference in position in one frame image caused by the rolling shutter type exposure and information on an exposure start sequence depending on the position in one frame image captured by the rolling shutter type exposure. This achieves appropriate correction of image distortion appearing in that moving region caused by the rolling shutter type exposure. This in result can reduce an image distortion in the frame image.

The present invention is also directed to a camera system comprising the above-described image processor and an image capturing apparatus for capturing a plurality of frame images by rolling shutter type exposure.

According to a second aspect of the invention, the image processor further includes an exposure-time determining part and a frame-image generating part, the exposure-time determining unit determines an exposure time period in the image capturing apparatus and divides the exposure time period by the same number as the number of the plurality of frame images to obtain divided exposure time periods, the image capturing apparatus captures each of the plurality of frame images during a corresponding one of the divided exposure time periods, and the frame-image generating part generates a composite frame image corresponding to a frame image captured during the exposure time period on the basis of the to-be-corrected frame image in which the moving region has been corrected and a remaining frame image of the plurality of frame images.

A composite frame image corresponding to a frame image captured during a predetermined exposure time period is generated, on the basis of the plurality of frame images captured during short divided exposure time periods, respectively. This allows reduction in random noise appearing in image signals in image capturing.

According to a third aspect of the invention, the frame-image generating part generates, in the composite frame image, an image region located in the same position as a region where the moving region in the to-be-corrected frame image with the moving region corrected has been located only before correction, on the basis of an image region located in the position except the moving region in the remaining frame image.

In the composite frame image, an image region located in the same position as a region where the moving region in the frame image with the moving region corrected has been located only before correction is generated on the basis of the remaining frame image other than the frame image with the moving region corrected. This allows the image region in the composite frame image to be generated with high fidelity to a subject.

According to a fourth aspect of the invention, the frame-image generating part generates, in the composite frame image, an image region located in the same position as the moving region in the to-be-corrected frame image with the moving region corrected, on the basis of the moving region in the to-be-corrected frame image with the moving region corrected and the moving region in the remaining frame image.

In the composite frame image, an image region located in the same position as the moving region in the to-be-corrected frame image with the moving region corrected is generated on the basis of the moving region in the to-be-corrected frame image with the moving region corrected and the moving region in the remaining frame image. This allows the image region in the composite frame image to be generated with high fidelity to a subject.

According to a fourth aspect of the invention, the frame-image generating part generates, in the composite frame image, an image region except an image region located in the same position as a region where the moving region in the to-be-corrected frame image with the moving region corrected has been located only before correction and an image region located in the same position as the moving region in the to-be-corrected frame image with the moving region corrected, on the basis of an image region except the moving region located in the same position in each of the to-be-corrected frame image with the moving region corrected and the remaining frame image.

In the composite frame image, an image region except an image region located in the same position as a region where the moving region in the to-be-corrected frame image with the moving region corrected has been located only before correction and an image region located in the same position as the moving region in the to-be-corrected frame image with the moving region corrected is generated on the basis of an image region except the moving region located in the same position in each of the to-be-corrected frame image with the moving region corrected and the remaining frame image. This allows the image region in the composite frame image to be generated with high fidelity to a subject.

According to a fifth aspect of the invention, the frame-image generating part generates a plurality of composite frame images, and the camera system further comprises a display device configured to display a motion picture on the basis of the plurality of composite frame images.

Displaying a motion picture on the basis of the plurality of composite frame images in which image distortions resulting from the rolling shutter type exposure have been corrected. This can provide a user with a motion picture that is easy to see, which is advantageous because the image distortions resulting from the rolling shutter type exposure particularly in a motion picture give great discomfort on the user.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram showing the operation of the CMOS sensor according to the preferred embodiment of the invention;

FIGS. 9 through 13 show the method of detecting a moving region according to the preferred embodiment of the invention;

DESCRIPTION OF THE PREFERRED EMBODIMENTS

Figure 1:
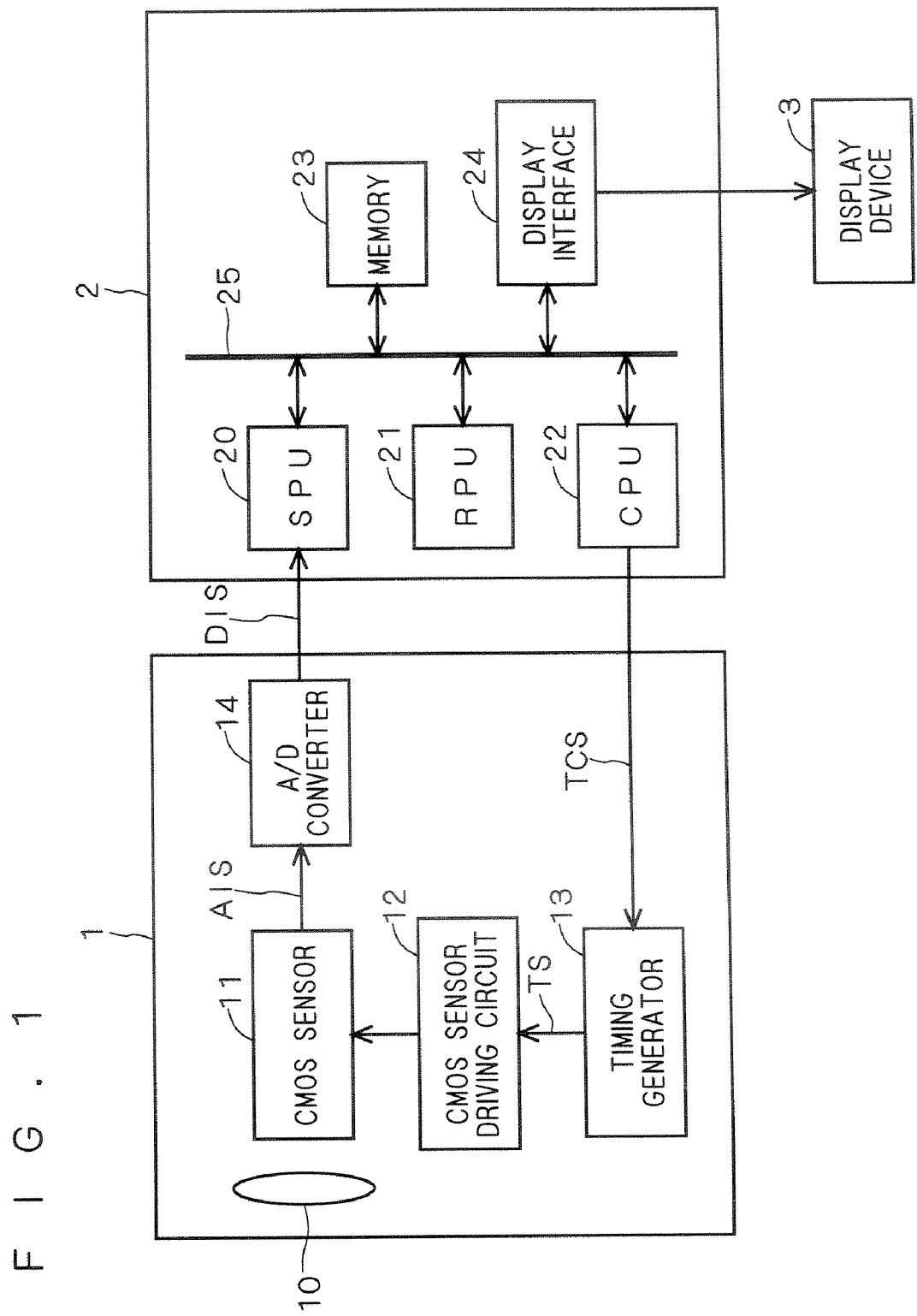
FIG. 1 is a block diagram showing the configuration of a camera system according to a preferred embodiment of the present invention.

FIG. 1 is a block diagram showing the configuration of a camera system according to a preferred embodiment of the present invention. The camera system according to the present embodiment is a digital still camera, for example, for capturing images by the rolling shutter type exposure. As shown in FIG. 1, the camera system includes an image capturing apparatus 1 for capturing images, an image processor 2 for carrying out image processing on images captured by the image capturing apparatus 1, and a display device 3 for displaying images processed by the image processor 2.

The image capturing apparatus 1 has a lens unit 10, a CMOS sensor 11, a CMOS sensor driving circuit 12, a timing generator 13 and an A/D converter 14. The CMOS sensor 11 converts light incident from a subject through the lens unit 10 into an electric signal to capture an image and outputs the captured image as an analog image signal AIS. The timing generator 13 generates and outputs a timing signal TS, and the CMOS sensor driving circuit 12 controls the operation of the CMOS sensor 11 on the basis of the timing signal TS. The A/D converter 14 converts the analog image signal AIS outputted from the CMOS sensor 11 into a digital image signal DIS and outputs it.

The image processor 2 has a sensor processing unit (SPU) 20 for carrying out image processing on the digital image signal DIS outputted from the A/D converter 14 of the image capturing apparatus 1, a real-time processing unit (RPU) 21 for further carrying out real-time image processing on the digital image signal DIS as processed in the SPU 20, a CPU 22 for controlling the overall operation of the image processor 2, a memory 23 for storing operating programs for the CPU 22, a digital image signal DIS currently undergoing image processing or having undergone image processing, and the like, and a display interface 24. These components are connected to one another via a bus 25.

The SPU 20 carries out preprocessing such as black level correction, white balance correction and the like on the inputted digital image signal DIS. The digital image signal DIS processed in the SPU 20 is outputted to the bus 25 to be stored in the memory 23. The RPU 21 reads out the digital image signal DIS processed in the SPU 20 from the memory 23, and carries out various types of filtering such as pixel interpolation, noise reduction, sharpening and the like on the digital image signal DIS. The RPU 21 also carries out correction for correcting an image distortion resulting from the rolling shutter type exposure on the digital image signal DIS in conjunction with the CPU 22. The digital image signal DIS processed in the RPU 21 is then outputted to the bus 25 to be stored in the memory 23.

The CPU 22 reads out the digital image signal DIS having completed a series of image processing from the memory 23, and outputs it to the display interface 24. The CPU 22 also executes image compression such as JPEG compression on the digital image signal DIS having completed the series of image processing, and stores the compressed digital image signal DIS in the memory 23. The CPU 22 further outputs a timing control signal TCS to the timing generator 13, and the timing generator 13 controls the timing signal TS on the basis of the timing control signal TCS.

The display interface 24 converts the inputted digital image signal DIS into a format according to the display device 3 and outputs the converted digital image signal DIS to the display device 3. The display device 3 is a liquid crystal display (LCD), for example, and displays a stationary image on the basis of the inputted digital image signal DIS.

Figure 2:
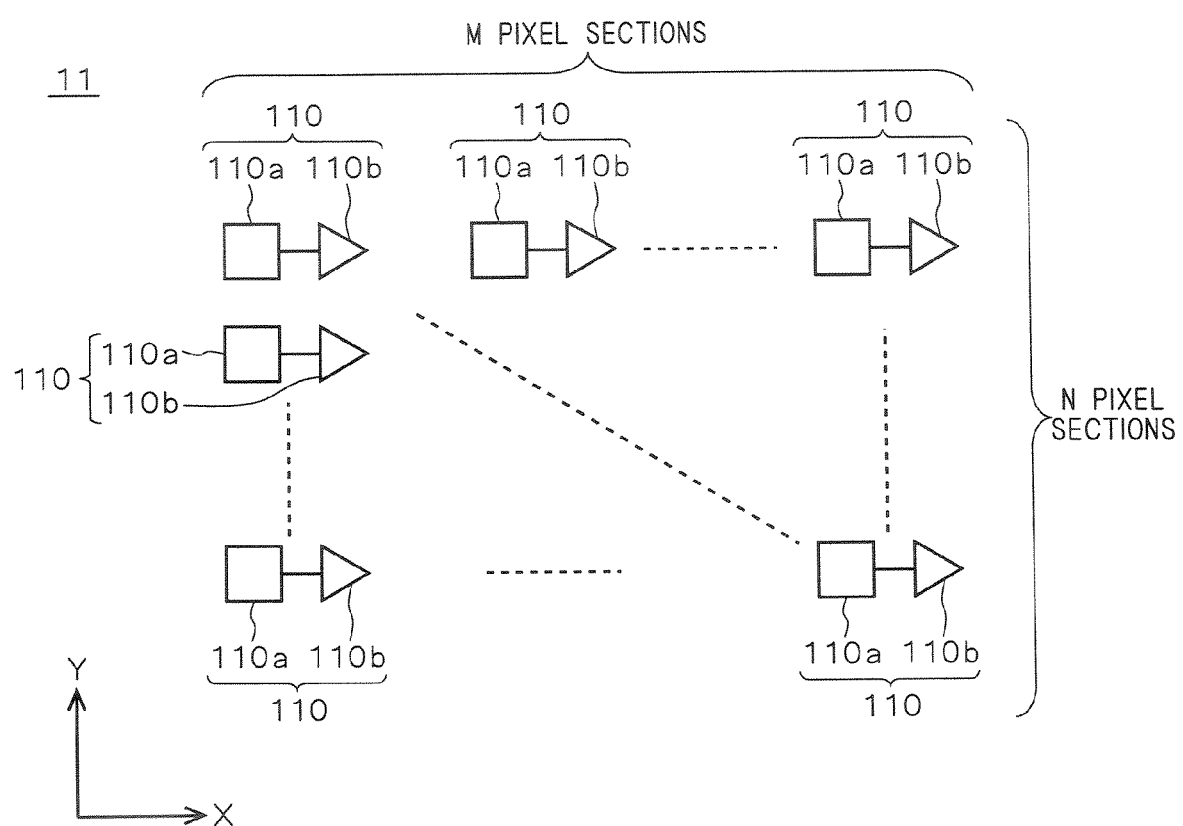
FIG. 2 is a diagram showing the structure of a CMOS sensor according to the preferred embodiment of the invention.

An image distortion caused by the rolling shutter type exposure will now be described along with the structure and operation of the CMOS sensor 11. FIG. 2 is a diagram showing the structure of the CMOS sensor 11. As shown in FIG. 2, the CMOS sensor 11 has a plurality of pixel sections 110 arrayed in a matrix in N rows and M columns (M, N≧2). More specifically, the CMOS sensor 11 has M pixel sections 110 arrayed in the row direction X on an image-capturing screen and N pixel sections 110 arrayed in the column direction Y.

Each of the pixel sections 110 is formed by a photodiode 110a and an amplifier 110b. The photodiode 110a produces charges in accordance with the intensity of incident light and accumulates them, the amount of accumulated charges increases as the irradiation time to the photodiode 110a increases. When a certain pixel section 110 is selected by the CMOS sensor driving circuit 12, the amplifier 110b of that pixel section 110 reads out charges accumulated in the photodiode 110a for amplification and outputs a pixel signal to the A/D converter 14. Hereinafter, a pixel section 110 in the n-th row ($1 \leq n \leq N$) and m-th column ($1 \leq m \leq M$) may be referred to as the "(n, m)th pixel section", and a pixel signal outputted therefrom may be called (n, m)th pixel signal.

FIG. 3 is a diagram showing the operation of the CMOS sensor 11. Arrows shown in the diagram indicate the timing at which pixel signals are read out from the pixel sections 110. As shown in FIG. 3, in the CMOS sensor 11 according to the present embodiment, M pixel sections 110 in the 1st row and 1st to M-th columns are selected sequentially, and pixel signals are sequentially read out from those M pixel sections 110. Then, M pixel sections 110 in the 2nd row and 1st to M-th columns are selected sequentially, and pixel signals are sequentially read out from those M pixel sections 110. Thereafter, pixel signals are similarly read out from pixel sections 110 in the 3rd row and 1st to M-th columns through pixel sections 110 in the N-th row and 1st to M-th columns, whereby an analog image signal AIS for one frame consisting of N×M pixel signals is obtained.

As described, in the CMOS sensor 11 according to the present embodiment, pixel signals are read out sequentially from M pixel sections 110 in a certain row and the 1st and subsequent columns under the control of the CMOS sensor driving circuit 12. After a pixel signal is read out from the pixel section 110 in the M-th column in that row, pixel signals are then read out sequentially from M pixel sections 110 in the next row and the 1st and subsequent columns. This means that the readout starting time of reading out pixel signals varies among N×M pixel sections 110 arrayed in the CMOS sensor 11.

In this CMOS sensor 11, as soon as a pixel signal is read out from a pixel section 110, the photodiode 110a of that pixel section 110 erases all accumulated charges and starts accumulating charges again. Accordingly, the exposure starting time varies among a plurality of pixel sections 110 among which the readout starting time of pixel signals varies. As shown in FIG. 3, a time between the readout starting time of a pixel signal and the readout starting time of the next pixel signal is equal between the plurality of pixel sections 110. This means that an exposure time period etd is equal between the plurality of pixel sections 110. Further, as shown in FIG. 3, in the CMOS sensor 11, a time difference std in exposure starting time between two pixel sections 110 from which pixel signals are read out sequentially is constant.

In contrast, when the entire surface of a CCD sensor simultaneously receives light from a subject with no mechanical shutter being provided, the charge accumulation starting time and accumulation time period are constant between a plurality of pixel sections in the CCD sensor. This means that the exposure starting time and exposure time period are constant between the plurality of pixel sections in the CCD sensor.

Figure 4A:
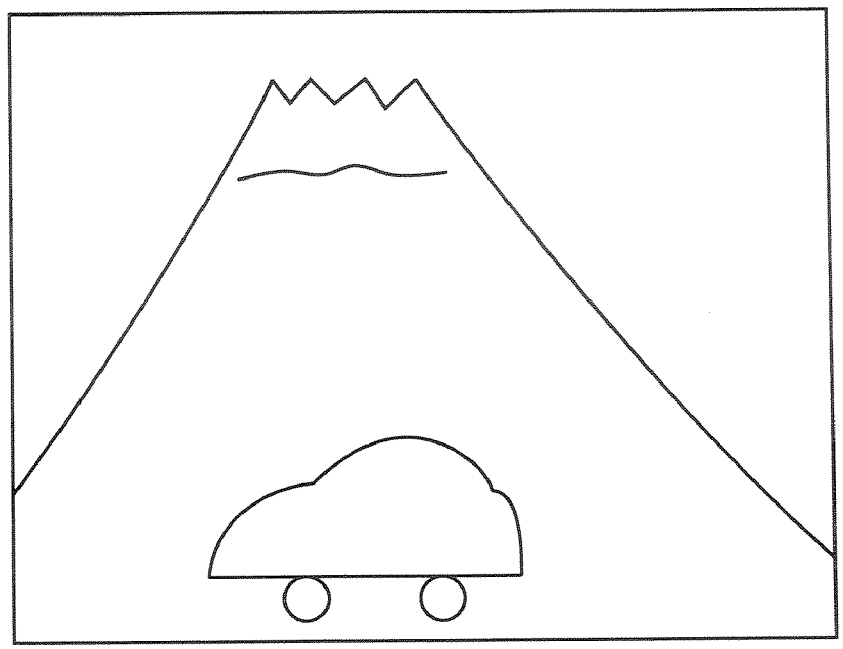
FIGS. 4A and 4B schematically show images captured by a CCD sensor and a CMOS sensor, respectively.
Figure 4B:
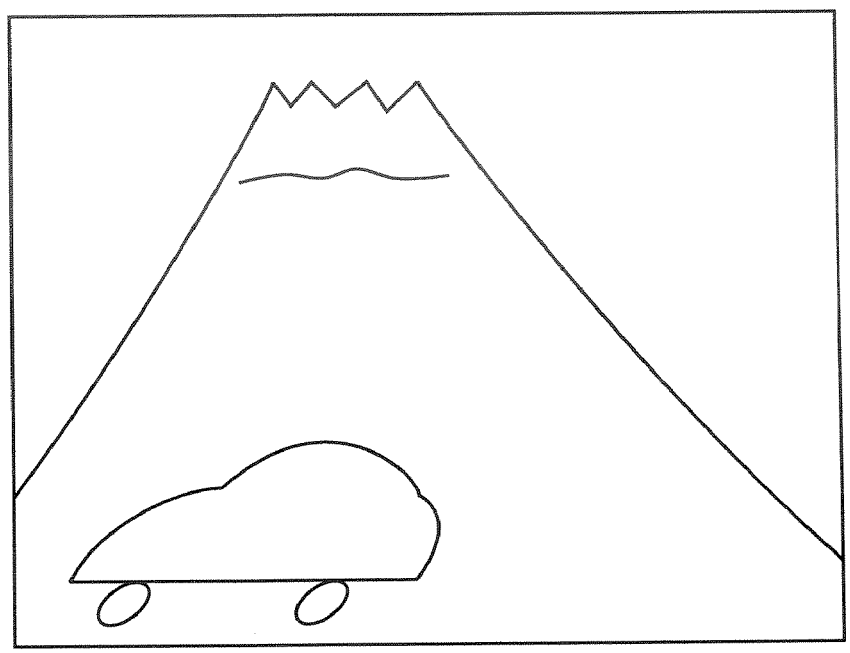

FIGS. 4A and 4B schematically show images captured by a CCD sensor and a CMOS sensor, respectively. FIG. 4A shows a frame image captured by a CCD sensor, and FIG. 4B shows a frame image captured by a CMOS sensor. As shown in FIG. 4A, when capturing an image of a car moving in front of a stationary mountain from right to left on the screen with the CCD sensor, the image of the car has no particular distortion. In contrast, when capturing an image of a similar subject with the CMOS sensor, the image of the car has a distortion as shown in FIG. 4B since the position of the car at the exposure starting time varies between one pixel section and another due to the difference in exposure starting time between the pixel sections.

As described, when capturing a subject by rolling shutter type exposure may cause a distortion in the image of the subject. Even when capturing a stationary subject by the rolling shutter type exposure, a distortion may similarly appear in the image of the subject because of hand shake of a user. In the present embodiment, such image distortion resulting from the rolling shutter type exposure (hereinafter called "rolling shutter effect") can be corrected by operation of the RPU 21 and CPU 22 of the image processor 2 in conjunction with each other.

Figure 5:
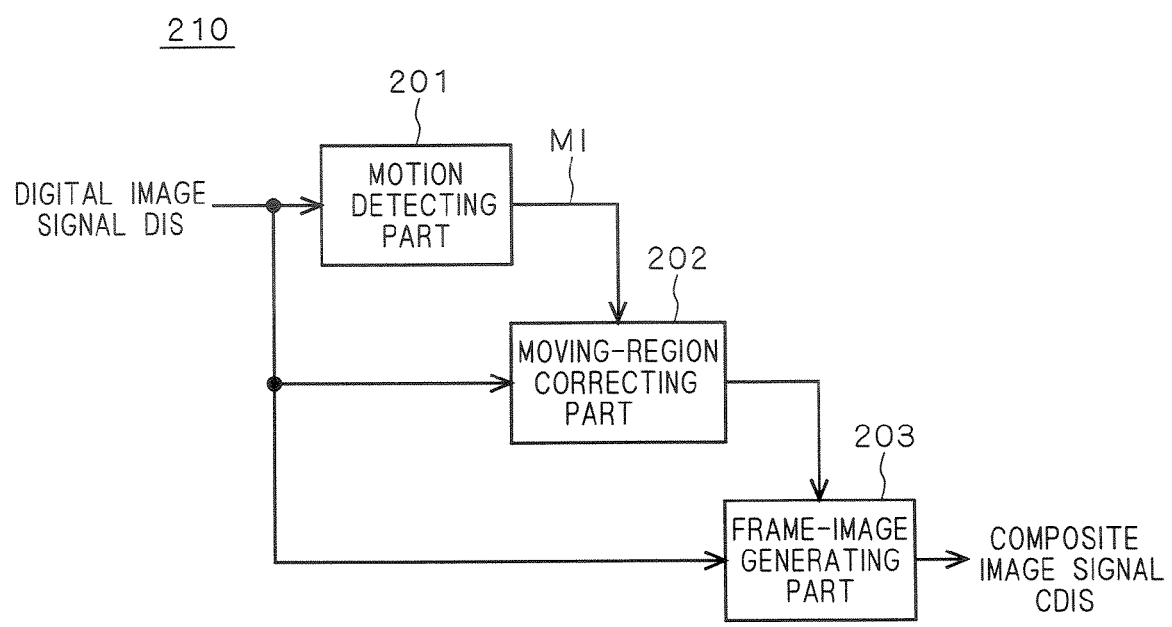
FIG. 5 is a functional block diagram of a rolling-shutter-effect correction device according to the preferred embodiment of the invention.

FIG. 5 is a functional block diagram of a rolling-shutter-effect correction device 210 formed in the image processor 2 by operation of the RPU 21 and CPU 22 in conjunction with each other. As shown in FIG. 5, the rolling-shutter-effect correction device 210 has a motion detecting part 201, a moving-region correcting part 202 and a frame-image generating part 203.

The motion detecting part 201 detects a moving region MVR in a set of a plurality of frame images captured sequentially with the image capturing apparatus 1 on the basis of the digital image signal DIS outputted from the image capturing apparatus 1 and obtains a motion vector of the moving region MVR.

The moving-region correcting part 202 corrects the moving region MVR detected by the motion detecting part 201 in a certain frame image in the set of plurality of frame images. As described above, when capturing a moving subject, for example, an image of the subject has a distortion resulting from the rolling shutter type exposure. That is, the rolling shutter effect occurs in the moving region MVR. Therefore, the rolling shutter effect can be corrected by appropriately correcting the moving region MVR. The moving region MVR mentioned in the present specification of the present invention shall include, not only an image region in a frame image where an actually moving subject is imaged, but also an image region shifted in position between a plurality of frame images due to the movement of the image capturing apparatus 1 caused by user's hand shake or the like while a subject is actually standing still.

The frame-image generating part 203 superimposes a frame image in which the moving region MVR has been corrected by the moving-region correcting part 202 upon a remaining frame image of a plurality of frame images to generate one composite frame image, and outputs the digital image signal DIS of that composite frame image as a composite image signal CDIS.

Figure 6:
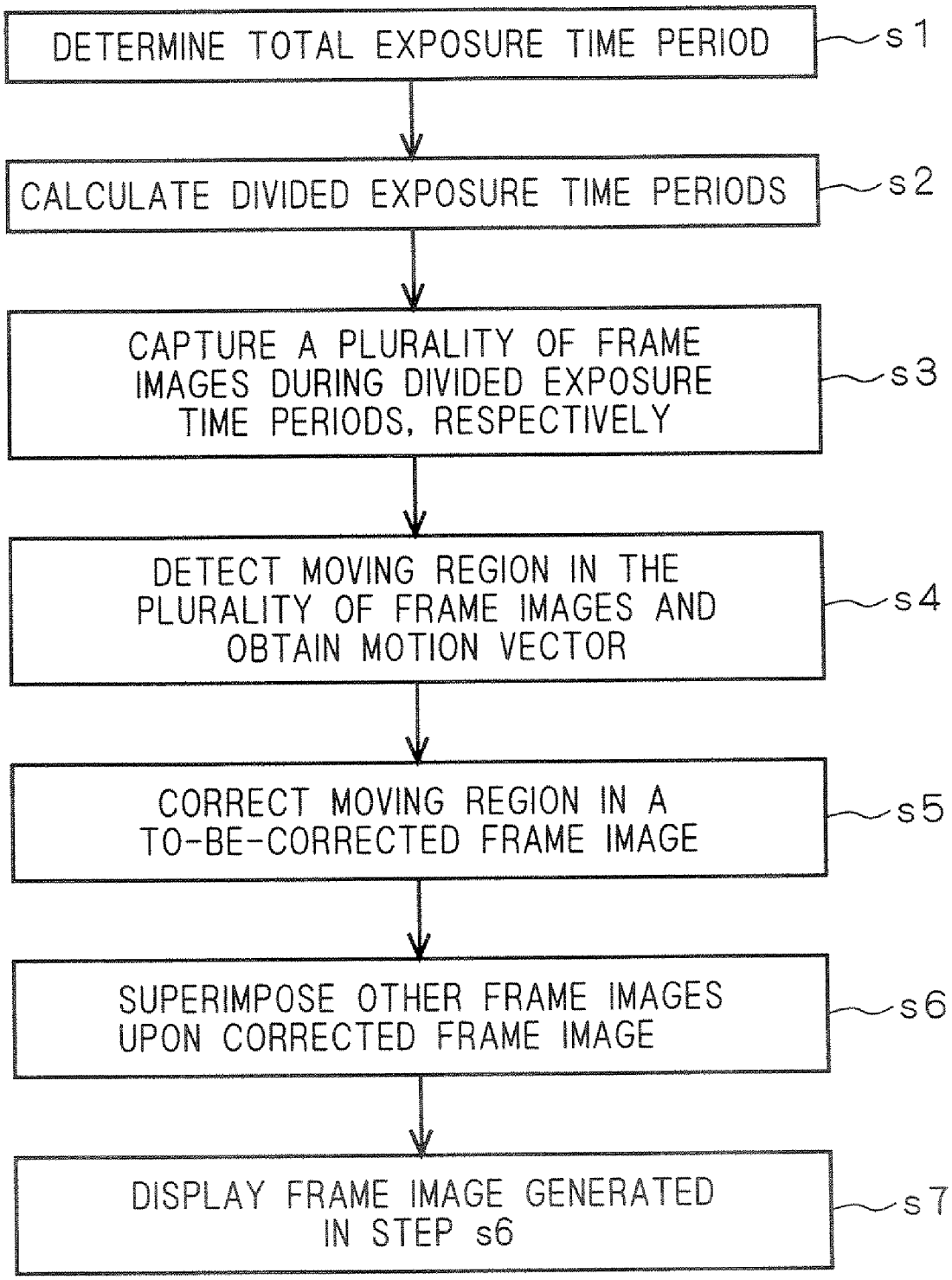
FIG. 6 is a flow chart of the operation of the camera system according to the preferred embodiment of the invention.

FIG. 6 is a flow chart of the operation of the camera system according to the preferred embodiment until a stationary image is displayed. In the camera system according to the preferred embodiment, for displaying a stationary image captured during a predetermined exposure time period, the predetermined exposure time period is divided into a plurality of times, a plurality of frame images are captured during the resultant short exposure time periods, respectively, and one composite frame image obtained by superimposing these plurality of frame images one upon another is displayed on the display device 3 as a stationary image captured during the predetermined exposure time period.

As shown in FIG. 6, in step s1, the CPU 22 determines an exposure time period required in the image capturing apparatus 1. The exposure time period determined in step s1 is called "total exposure time period". For instance, the CPU 22 determines the total exposure time period on the basis of the illumination in the image capturing environment outputted from an illumination sensor not shown and information on the performance of the CMOS sensor 11 previously stored in the memory 23. Next, in step s2, the CPU 22 divides the total exposure time period into a plurality of times. Here, the number of divisions shall be L ($\geq$2), and the plurality of times obtained by dividing the total exposure time period are each called "divided exposure time period".

Next, in step s3, the image capturing apparatus 1 captures L frame images as many as the number of divisions of the total exposure time period, during the divided exposure time periods obtained in step s2, respectively. More specifically, in step s3, the CPU 22 controls the timing control signal TCS on the basis of the divided exposure time periods obtained in step s2, and the timing generator 13 controls the timing signal TS on the basis of the inputted timing control signal TCS. Then, the CMOS sensor driving circuit 12 controls the operation of the CMOS sensor 11 on the basis of the inputted timing signal TS. The respective pixel sections 110 in the CMOS sensor 11 thereby accumulate charges during accumulation time periods in accordance with the divided exposure time periods obtained in step s2, respectively, and amplify them. Then, the respective pixel sections 110 output them as pixel signals. The respective pixel signals are inputted to the A/D converter 14, and the A/D converter 14 outputs a digital image signal DIS for one frame. This operation is repeated L times continuously, so that L frame images are obtained in the image capturing apparatus 1.

Figure 7:
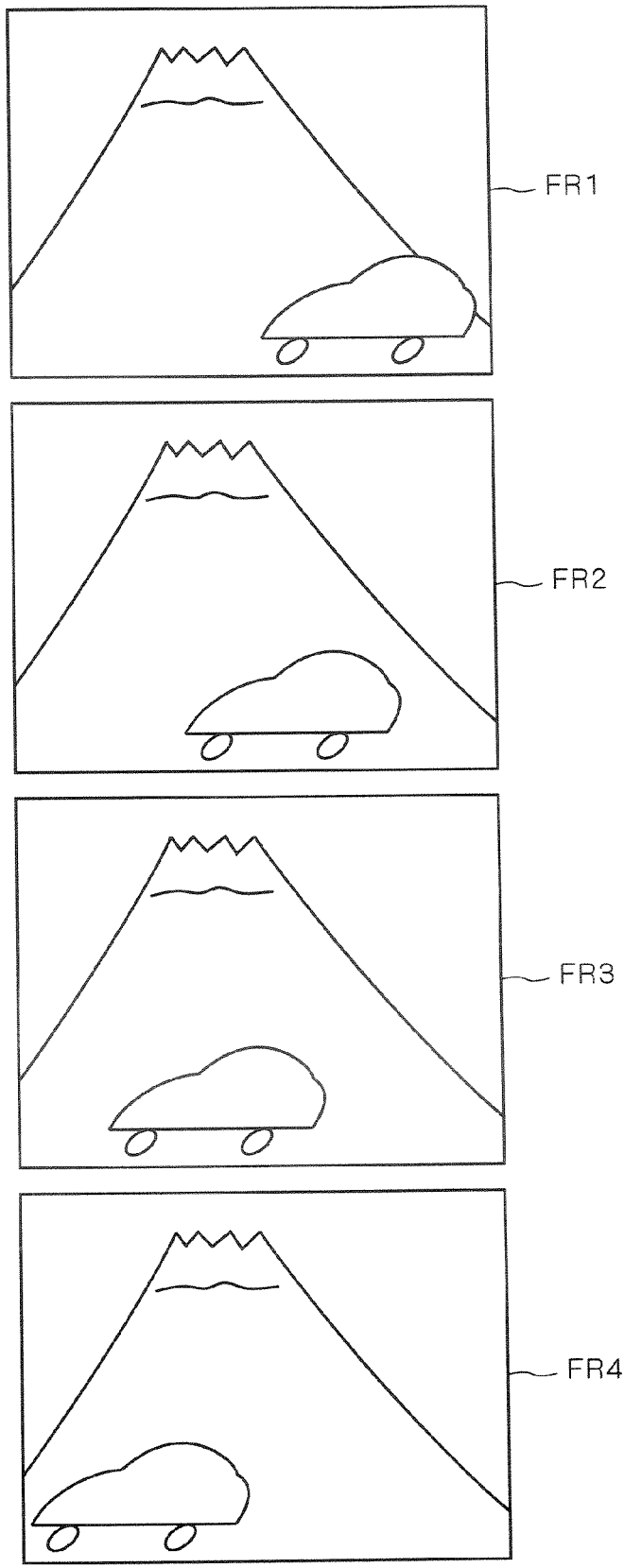
FIG. 7 shows example of a plurality of frame images captured by an image capturing apparatus according to the preferred embodiment of the invention.

FIG. 7 shows an example of a plurality of frame images captured in step s3. FIG. 7 shows frame images FR1 to FR4 obtained by sequentially capturing images of a car moving in front of a stationary mountain from right to left on the screen, similarly to FIGS. 4A and 4B. The frame images FR1 to FR4 are shown in ascending order of image-capturing time from top of the sheet of drawing. Since the image-capturing time varies between the frame images FR1 to FR4, the position where the image of the moving car is shown varies from one another as shown in FIG. 7. In each of the frame images FR1 to FR4, the image of the car has a distortion due to the rolling shutter effect. Hereinafter, the operation of the camera system will be described assuming that the frame images FR1 to FR4 shown in FIG. 7 are captured in step s3.

When the frame images FR1 to FR4 are captured with the image capturing apparatus 1, the RPU 21 of the image processor 2 carries out pixel interpolation on digital image signals DIS for four frames outputted from the A/D converter 14. Then, in step s4, the motion detecting part 201 detects the moving region MVR in each of the four frame images FR1 to FR4 having undergone pixel interpolation. In the present embodiment, defining one of the four frame images FR1 to FR4 as a reference frame image, the reference frame image and each remaining one of the four frame images FR1 to FR4 are compared to each other, to thereby detect the moving region MVR in the respective frame images FR1 to FR4. In the following example, the frame image FR1 is defined as the reference frame image, and may be called "a reference frame image FR1" as well. The motion detection method according to the present embodiment will now be described.

Figure 8:
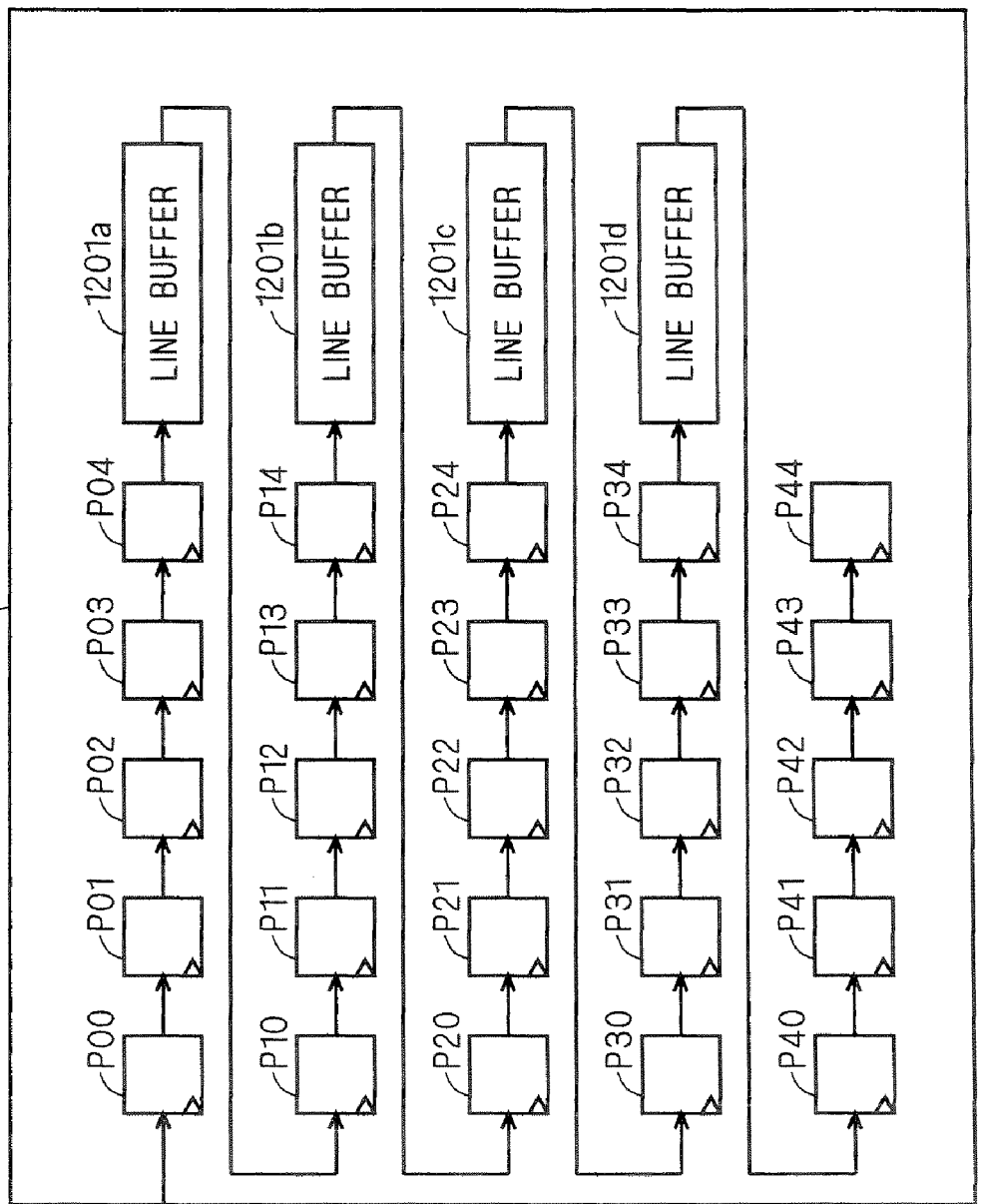
FIG. 8 is a block diagram showing the configuration of an image memory according to the preferred embodiment of the invention.

FIG. 8 is a block diagram showing the configuration of an image memory 1201 included in the motion detecting part 201. As shown in FIG. 8, the image memory 1201 has twenty-five resistors P00 to P44 arrayed in five rows and five columns and four line buffers 1201a to 1201d. Each of the resistors P00 to P44 is capable of storing a pixel signal for one pixel, and each of the line buffers 1201a to 1201d is a FIFO memory capable of storing pixel signals for (M−5) pixels.

Five resisters P00 to P04 in the 1st row, line buffer 1201a, five resisters P10 to P14 in the 2nd row, line buffer 1201b, five resistors P20 to P24 in the 3rd row, line buffer 1201c, five resistors P30 to P34 in the 4th row, line buffer 1201d and five resistors P40 to P44 in the 5th row are connected in series in this order.

The resistors P00 to P44 and line buffers 1201a to 1201d each receive a clock signal not shown. The resistors P00 to P44 each latch an inputted signal when a clock signal rises, and outputs it to the subsequent stage. When the clock signal rises, the line buffers 1201a to 1201d each latch a current inputted signal as well as outputting an inputted signal latched on the rising edge of the (M−5)th clock signal earlier, to a resistor of the subsequent stage. In short, the line buffers 1201a to 1201d each latch an inputted signal during (M−5) clocks, and outputs the inputted signal to a resistor of the subsequent stage after the lapse of (M−5) clocks. Here, "clock" means the time interval between two consecutive rising edges of clock signals.

The resistor P00 receives N×M pixel signals for one frame in series in synchronization with a clock signal. More specifically, the resistor P00 sequentially receives a (1, 1)th pixel signal to a (1, M)th pixel signal, and then, sequentially receives a (1, 2)th pixel signal to a (2, M)th pixel signal. Thereafter, similarly, the resistor P00 sequentially receives a (3, 1)th pixel signal to a (N, M)th pixel signal.

In the image memory 1201 configured as such, a (1, 1)th pixel signal in a certain frame image is stored in the resistor P00 on the rising edge of a clock signal, and on the rising edge of the next clock signal, the (1, 1)th pixel signal is stored in the resistor P01 while a (1, 2)th pixel signal is stored in the resistor P00. Then, on the rising edge of the next clock signal, the (1, 1)th pixel signal is stored in the resistor P02 while the (1, 2)th pixel signal is stored in the resistor P01, and a (1, 3)th pixel signal is stored in the resistor P00. Thereafter, similarly, at the same time when the (1, 1)th pixel signal is stored in the resistor P04 on the rising edge of a clock signal, the (1, 2)th pixel signal is stored in the resistor P03, the (1, 3)th pixel signal is stored in the resistor P02, a (1, 4)th pixel signal is stored in the resistor P01, and a (1, 5)th pixel signal is stored in the resistor P00.

On the rising edge of the next clock signal, the (1, 1)th pixel signal is stored in the line buffer 1201a, and on the rising edge of the succeeding (M−5)th clock signal, the pixel signal is outputted from the line buffer 1201a to be stored in the resistor P10. Then, similarly, when the (1, 1)th pixel signal is stored in the resistor P44, pixel signals in the 5th row and 1st to 5th columns are stored in the five resistors P00 to P04 in the 1st line, pixel signals in the 4th row and 1st to 5th columns are stored in the five resistors P10 to P14 in the 2nd line, pixel signals in the 3rd row and 1st to 5th columns are stored in the five resistors P20 to P24 in the 3rd line, pixel signals in the 2nd row and 1st to 5th columns are stored in the five resistors P30 to P34 in the 4th line, and pixel signals in the 1st row and 1st to 5th columns are stored in the five resistors P40 to P44 in the 5th line. Thereafter, the image memory 1201 carries out a similar operation until the (N, M)th pixel signal is stored in the resistor P00.

In the image memory 1201 carrying out such operation, the twenty-five resistors P00 to P44 temporarily store twenty-five pixel signals in a block region formed by N×M pixels in one frame image.

In the present embodiment, in step s5, N×M pixel signals in the frame image FR2 are sequentially inputted to the image memory 1201. Then, pixel signals in the frame image FR2 inputted to the resistors P00 to P44 of the image memory 1201 are compared to pixel signals in the reference frame image FR1, to thereby detect the moving region MVR in the frame image FR2 based on the result of comparison. Hereinafter, a (n−1, m−1)th pixel signal in the frame image FR2 will be referred to as "a pixel signal Anm" and a (n−1, m−1)th pixel signal in the reference frame image FR1 will be referred to as "a pixel signal Qnm".

Figure 9:
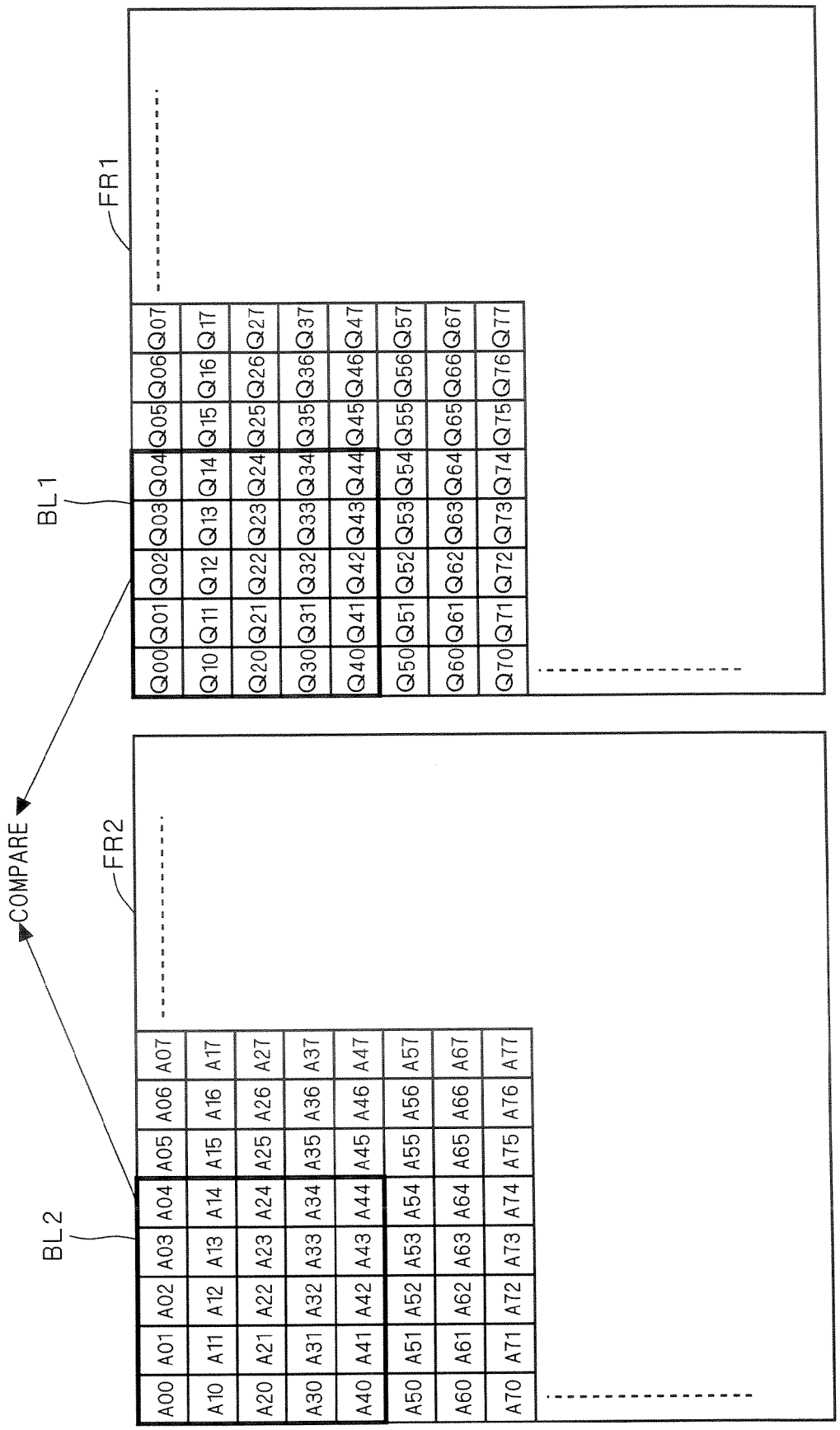

FIGS. 9 through 13 show the method of detecting the moving region MVR in the frame image FR2. As shown in FIG. 9, in the reference frame image FR1, attention shall be given to a block region BL1 formed by a plurality of 5×5 pixels where the (1, 1)th pixel and the (5, 5)th pixel are diagonally opposite to each other. In the frame image FR2, attention should be given to a block region BL2 formed by a plurality of 5×5 pixels where the (1, 1)th pixel and the (5, 5)th pixel are diagonally opposite to each other. When pixel signals A00 to A04, A10 to A14, A20 to A24, A30 to 34 and A40 to A44 in the block region BL2 are outputted from the resistors P00 to P44 of the image memory 1201, these pixel signals are compared to pixel signals Q00 to Q04, Q10 to Q14, Q20 to Q24, Q30 to Q34 and Q40 to Q44 in the block region BL1 of the reference frame image FR1 on a pixel-by-pixel basis. More specifically, the absolute value of a difference between a pixel signal in the block region BL1 and a pixel signal in the same position as that pixel signal in the block region BL2 is calculated. Such calculation of the absolute value is made for all the pixel signals in the block regions BL1 and BL2. Then, the total sum of calculated absolute values is obtained. Hereinafter, the total sum will be mentioned as "similarity". As the similarity decreases, the block regions BL1 and BL2 become more similar to each other.

Figure 10:
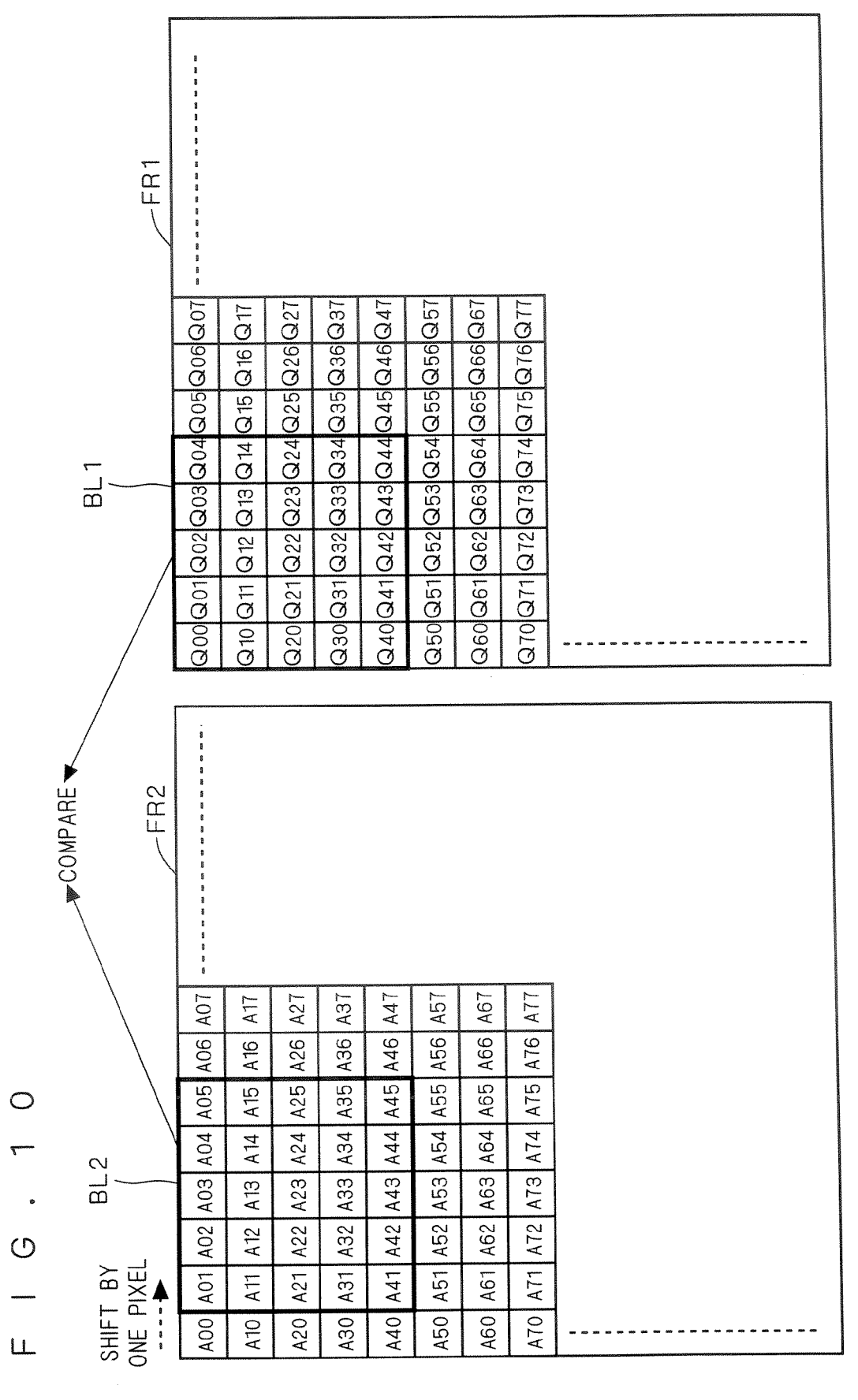

Next, as shown in FIG. 10, when a new clock signal to the image memory 1201 rises, pixel signals A01 to A05, A11 to A15, A21 to A25, A31 to A35 and A41 to A45 in a block region BL2 shifted from the block region BL2 shown in FIG. 9 by one pixel in the row direction are outputted from the resistors P00 to P44 of the image memory 1201. Then, similarly, these pixel signals are compared to pixel signals in the block region BL1 on a pixel-by-pixel basis, to thereby obtain the similarity between the block regions BL1 and BL2. At this time, the block region BL1 is located in the same position as shown in FIG. 9.

Next, when a new clock signal to the image memory 1201 rises, pixel signals A02 to A06, A12 to A16, A22 to A26, A32 to A36 and A42 to A46 in a block region BL2 shifted from the block region BL2 shown in FIG. 10 by one pixel in the row direction are outputted from the resistors P00 to P44 of the image memory 1201. Then, similarly, these pixel signals are compared to pixel signals in the block region BL1 on a pixel-by-pixel basis, to thereby obtain the similarity between the block regions BL1 and BL2. Thereafter, similar operations are carried out to obtain the similarity between the block region BL1 and the block region BL2 located at the outermost edge of the frame image FR2, i.e., the block region BL2 where the (1, M−4)th pixel and the (4, M)th pixel are diagonally opposite to each other. Next, giving attention to a block region BL2 shifted from the previous block region BL2 by one pixel in the column direction, the similarity between the block region BL1 and the block region BL2 where the (2, 1)th pixel and the (6, 5)th pixel are diagonally opposite to each other is obtained. Then, similarly, the similarity between the block region BL1 and a block region BL2 shifted from the previous block region BL2 by one pixel in the row direction is obtained. When the similarity between the block region BL1 and the block region BL2 located at the outermost edge of the frame image FR2 is obtained, attention is now given to a block region BL2 shifted further by one pixel in the column direction, and a similar operation is carried out.

Figure 11:
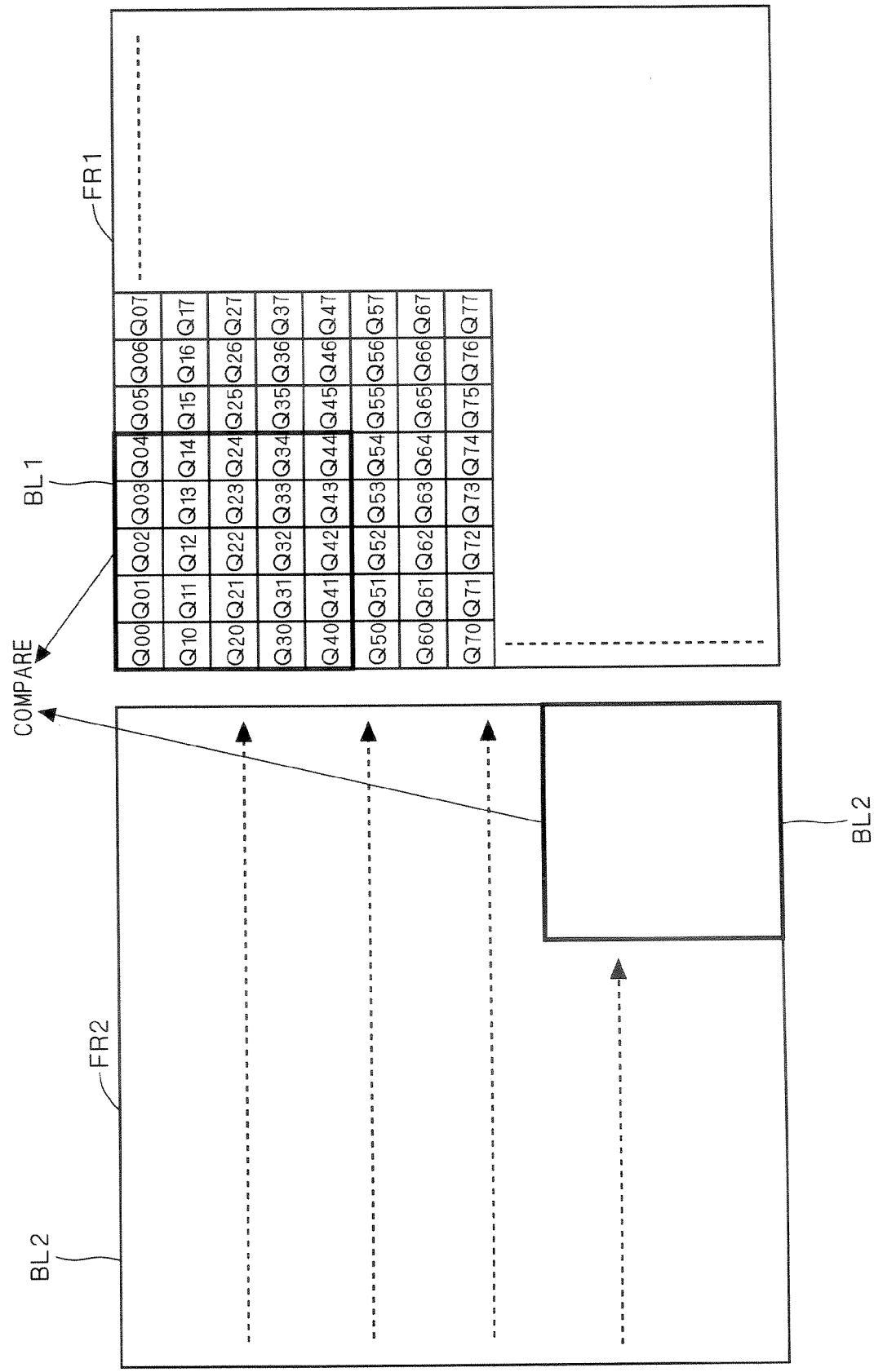

The above operation is carried out until the similarity between the block region BL1 and the block region BL2 located at the right lowermost edge as shown in FIG. 11, i.e., the block region BL2 where the (N−4, M−4)th pixel and the (N, M)th pixel are diagonally opposite to each other is obtained, at which time (N−4)×(M−4) pieces of similarity are obtained. Then, a block region BL2 corresponding to the similarity having the smallest value among these obtained pieces of similarity is determined as an image region in the frame image FR2 corresponding to the block region BL1 where the (1, 1)th pixel and the (5, 5)th pixel are diagonally opposite to each other.

Figure 12:
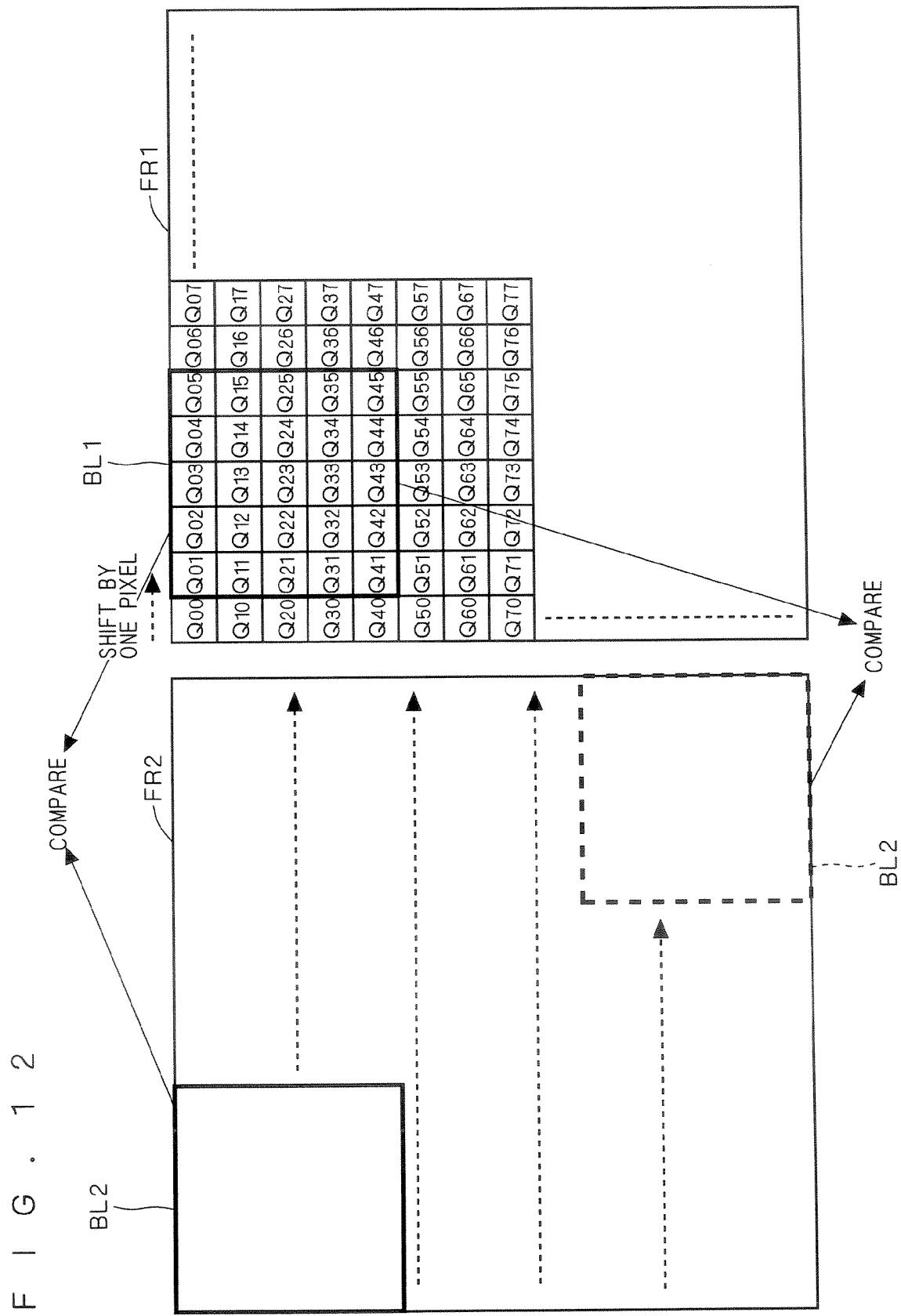

When the block region BL2 corresponding to the block region BL1 in the reference frame image FR1 shown in FIG. 9 is thus detected in the frame image FR2, then, attention is now given to a block region BL1 shifted from the previous block region BL1 shown in FIG. 11 by one pixel in the row direction in the reference frame image FR1, as shown in FIG. 12, where the (1, 2)th pixel and the (5, 6)th pixel are diagonally opposite to each other. Pixel signals in the frame image FR2 are newly inputted to the image memory 1201, and a similar operation is carried out to detect the block region BL2 corresponding to that block region BL1 from the frame image FR2.

Figure 13:
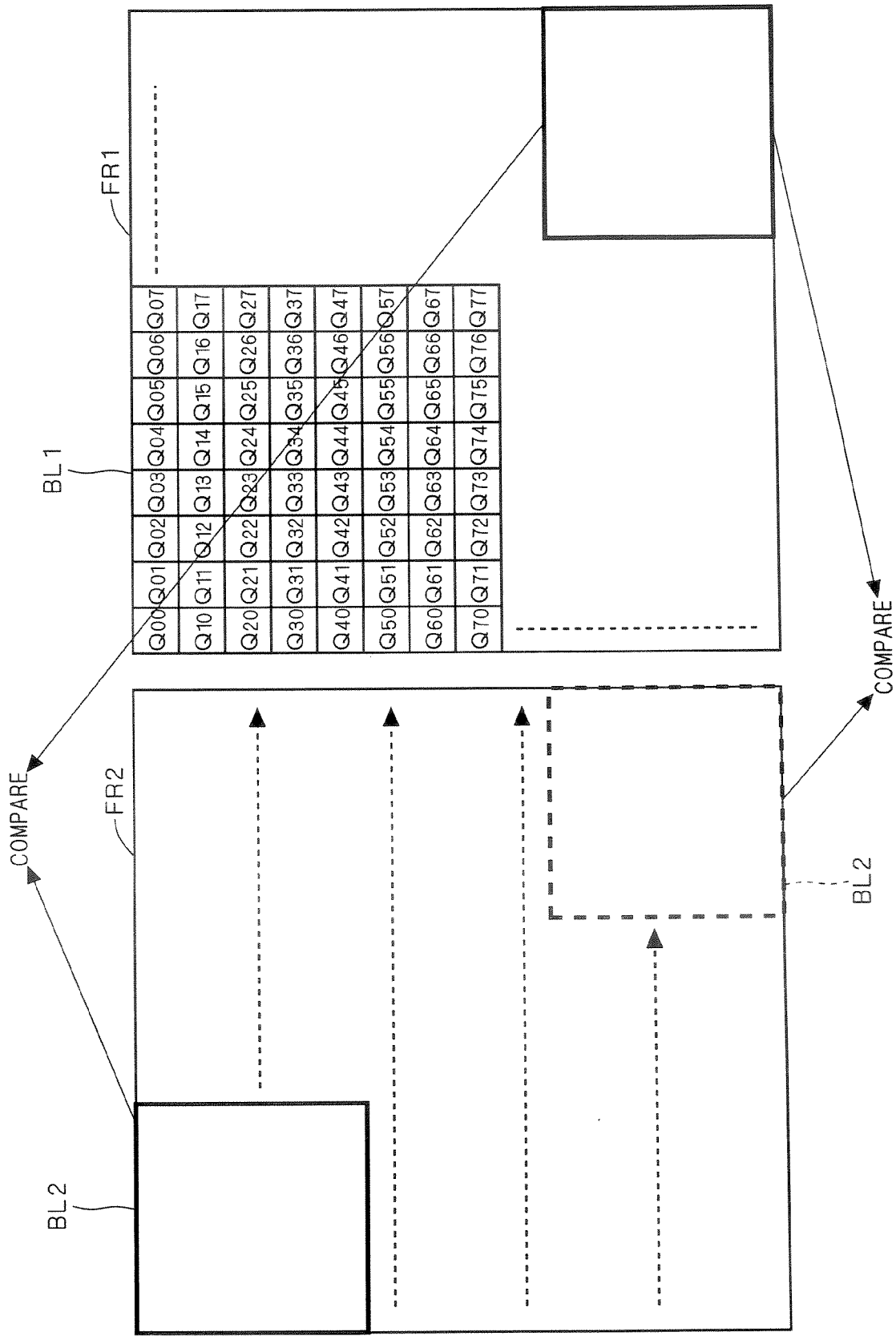

When the block region BL2 corresponding to the block region BL1 shown in FIG. 12 is detected from the frame image FR2, the block region BL1 is further shifted by one pixel in the column direction, to thereby carry out a similar operation. When the block region BL1 is shifted to one outermost edge of the reference frame image FR1, the block region BL1 is shifted downward by one pixel, and similar operations are carried out while shifting the block region BL1 to the other outermost edge of the reference frame image FR1. Such operations are carried out until a block region BL2 corresponding to the block region BL1 located at the right lowermost edge, as shown in FIG. 13, where the (N−4, M−4)th pixel and the (N, M)th pixel are diagonally opposite to each other is detected.

In this manner, when a block region BL2 corresponding to each of (N−4)−(M−4) block regions BL1 in the reference frame image FR1 is detected in the frame image FR2, a motion vector between the block regions BL1 and BL2 in each combination of block regions BL1 and BL2 corresponding to each other is obtained, and the absolute value thereof, i.e., a motion vector amount mva is further obtained. Letting the X and Y coordinates of the center of the block region BL1 be x1 and y1, respectively, and the X and Y coordinates of the center of the block region BL2 in the frame image FR2 corresponding to that block region BL1 be x2 and y2, respectively, the motion vector amount mva is calculated by the following equation (1):

$$mva=\sqrt{(x1-x2)^2+(y1-y2)^2} \quad (1)$$

It is judged whether the motion vector amount mva is larger than a predetermined threshold value for each combination of block regions BL1 and BL2 corresponding to each other. When the motion vector amount mva is larger than the predetermined threshold value, each of the block regions BL1 and BL2 corresponding to that motion vector amount mva are determined as moving block regions, respectively. Then, an image region formed by all moving block regions in the reference frame image FR1 are determined as a moving region MVR in the reference frame image FR1, and an image region formed by all moving block regions in the frame image FR2 are determined as a moving region MVR in the reference frame image FR2. Accordingly, a region almost the same as the image region of the car which is a moving subject is detected as the moving region MVR. As to image signals in an area where a plurality of moving block regions overlap one another in the moving region MVR, an image signal of either one of those moving block regions is employed.

Further, an arbitrary moving block region in the reference frame image FR1 is selected, and the motion vector between that moving block region and its corresponding moving block region in the frame image FR2 is determined as the motion vector of the moving region MVR between the reference frame image FR1 and frame image FR2.

The above operation is carried out between the frame images FR1 and FR3 and between the frame images FR1 and FR4, to thereby detect the moving region MVR in each of the frame images FR3 and FR4 as well as obtaining the motion vector between the moving regions MVR of the frame images FR1 and FR3 and the motion vector between the moving regions MVR of the frame images FR1 and FR4. In this manner, the moving region MVR is specified in each of the four frame images FR1 to FR4 in step s4.

Figure 14:
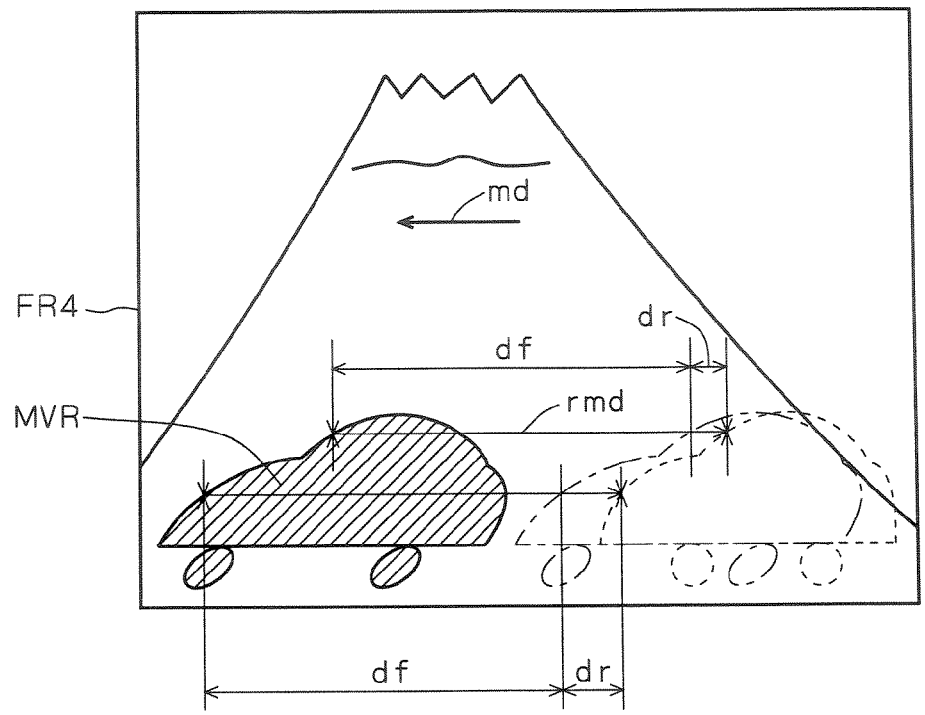
FIG. 14 shows the method of correcting the moving region according to the preferred embodiment of the invention.

Next, in step s5, the moving-region correcting part 202 defines a certain frame image of the frame images FR1 to FR4 captured in step s2 as a to-be-corrected frame image, and corrects the moving region MVR in the to-be-corrected frame image. In the present embodiment, the frame image FR4 is defined as a to-be-corrected frame image, and the moving region MVR in the frame image FR4 is corrected. FIG. 14 shows an example of the method of correcting the moving region MVR. In the frame image FR4 shown in FIG. 14, the moving region MVR is shaded diagonally downward to the left, and the moving region MVR having been corrected is indicated by broken lines. For ease of description, the moving region MVR in the frame image FR1 is also indicated in the same position by alternate long and short dashed lines.

In step s5, the moving region MVR in the frame image FR4 is corrected on the basis of the motion vector obtained in step s4, image-capturing-time-interval information, exposure-starting-time-difference information and exposure-start-sequence information. Here, the image-capturing-time-interval information relates to the image-capturing time interval between a plurality of frame images captured as one set, and in the present embodiment, contains information on an image-capturing time interval td1 between two frame images consecutively captured among the plurality of frame images FR1 to FR4. The image-capturing time interval td1 is constant among the frame images FR1 to FR4. The exposure-starting-time-difference information relates to the difference in exposure starting time resulting from the difference in position in one frame image caused by the rolling shutter type exposure, and in the present embodiment, contains information on the aforementioned time difference std in exposure starting time between pixels. The exposure-start-sequence information relates to the exposure start sequence in one frame image captured by the rolling shutter type exposure, i.e., information indicating the sequence in which exposures are made at a plurality of pixel positions in one frame image captured by the rolling shutter type exposure. In a frame image captured by the CMOS sensor 11 according to the present embodiment, exposure is started sequentially from the 1st to M-th columns in a certain row, and when exposure in the M-th column in the certain row is finished, exposure is started at the 1st column in the next row. This exposure-start-sequence information according to the present embodiment contains information on the exposure start sequence. The image-capturing-time-interval information, exposure-starting-time-difference information and exposure-start-sequence information are previously stored in the memory 23. Hereinafter, processing in step s5 will be described in detail.

In step s5, first, a moving direction md and moving distance df of the moving region MVR between the frame images FR1 and FR4 is obtained on the basis of the motion vector of the moving region MVR between the frame images FR1 and FR4. More specifically, defining the direction pointed by the motion vector of the moving region MVR between the frame images FR1 and FR4 as the moving direction md, the absolute value of that motion vector is obtained as the moving distance df. That is, the motion vector amount mva is equal to the moving distance df. The moving-region correcting part 202 further obtains a moving speed mv of the moving region MVR between the frame images FR1 and FR4 on the basis of the obtained moving distance df and the image-capturing time interval td1 obtained from the image-capturing time interval information. Letting the speed of the car be constant between the frame images FR1 to FR4, the moving speed mv is expressed as: mv=df/(3×td1).

Next, in the frame image FR4 shown in FIG. 14, the respective pixels in the moving region MVR are shifted in position by the moving distance df in the opposite direction rmd to the moving direction md, and are further shifted by a correction amount dr necessary for correcting the rolling shutter effect, whereby the respective pixels are employed instead of pixels located in the pixel positions at the destination of shift. That is, the respective pixels in the moving region MVR are shifted in position in the opposite direction rmd to the moving direction md by (moving distance df+correction amount dr), whereby pixel signals of the respective pixels are employed instead of pixel signals of the pixels located in the pixel positions at the destination of shift. The correction amount dr in this example is a value that varies between pixel positions. Hereinafter, this correction amount dr will be described.

In the CMOS sensor 11 according to the present embodiment, the exposure starting time varies between pixel positions, as described above. The car moves between the exposure starting time in a pixel position where exposure is initially started in the moving region MVR (which will hereinafter be called "a reference pixel position") and the exposure starting time in another pixel position in the moving region MVR. This means that shifting a to-be-corrected pixel in the opposite direction to the moving direction of the car by the distance in which the car has moved between the exposure starting time in the reference pixel position and the exposure starting time in the pixel position where the to-be-corrected pixel is located can place the to-be-corrected pixel to its original position. The correction amount dr is expressed by the following equation (2):

$$dr = mv \times p \times std \qquad (2)$$

In the equation (2), p is a value indicating when the exposure in the position where the to-be-corrected pixel is located starts, starting from the exposure in the reference pixel position, which can be obtained from the exposure-starting-sequence information. For instance, letting the reference pixel position be in the 2nd row and 2nd column and a to-be-corrected pixel be in the 2nd row and 10th column, exposure starts in the position of the to-be-corrected pixel in the eighth order from the start of exposure in the reference pixel position, which means p is 8. Accordingly, "p×std" in the equation (2) indicates the time period from the start of exposure in the reference pixel position to the start of exposure in the pixel position where the to-be-corrected pixel is located. The correction amount dr for a pixel located in the reference pixel position in the moving region MVR is set at 0 substituting 0 for p in the equation (2). In other words, in the present example, the pixel located in the reference pixel position in the moving region MVR is shifted by the moving distance df.

Figure 15:
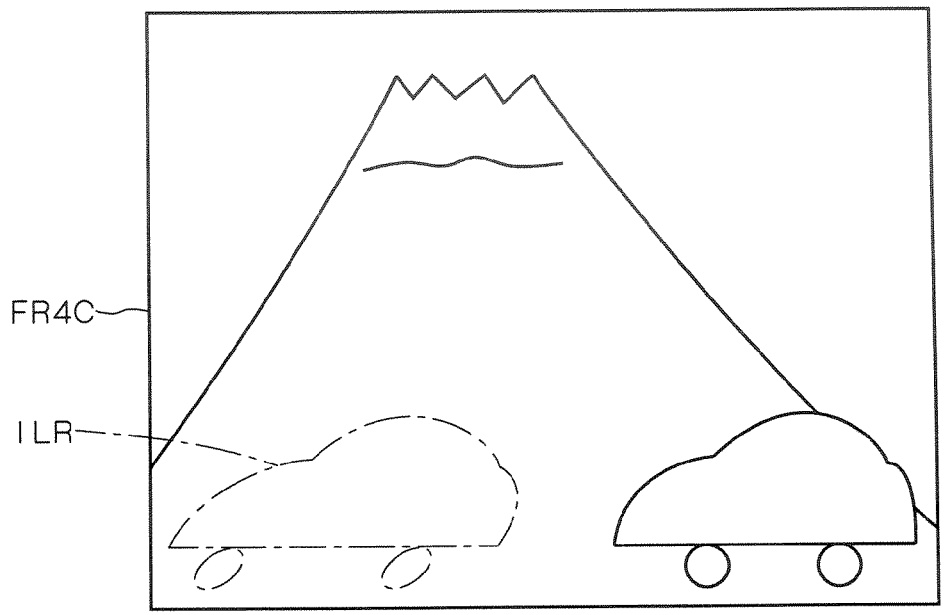
FIG. 15 shows a frame image corrected by the method of correcting the moving region according to the preferred embodiment of the invention.

As described, in the frame image FR4, shifting the respective pixels in the moving region MVR in the opposite direction rmd to the moving direction md by (moving distance df+correction amount dr) allows the moving region MVR to be shifted to almost the same position as in the reference frame image FR1 and can also correct the rolling shutter effect appearing in that moving region MVR. FIG. 15 shows the frame image FR4 having been corrected (which will hereinafter be called "a corrected frame image FR4C").

In the corrected frame image FR4C, pixel signals in a region where the moving region MVR has originally been located are unnecessary information after the correction of the moving region MVR, and therefore may have arbitrary values. Hereinafter, the region where the moving region MVR has originally been located in the corrected frame image FR4C will be called "an image-lost region ILR". The image-lost region ILR is indicated by alternate long and short dashed lines in FIG. 15.

Next, in step s6, the frame-image generating part 203 generates a composite frame image CFR corresponding to a frame image captured during the total exposure time period on the basis of the corrected frame image FR4C and the rest of the frame images FR1 to FR3. Then, in step s7, the display device 3 displays the composite frame image CFR generated in step s6. Hereinafter, the method of generating the composite frame image CFR will be described in detail.

First, each pixel signal in an image region in the corrected frame image FR4C except the image-lost region ILR, each pixel signal in an image region of the frame image FR1 except an image region located in the same position as the moving region MVR in the corrected frame image FR4C and the moving region MVR, each pixel signal in an image region of the frame image FR2 except an image region located in the same position as the moving region MVR in the corrected frame image FR4C and the moving region MVR, and each pixel signal in an image region of the frame image FR3 except an image region located in the same position as the moving region MVR in the corrected frame image FR4C and the moving region MVR are combined to one another in the same pixel position to superimpose these image regions one upon another. A frame image thus obtained will hereinafter be called "an intermediate frame image MFR".

Next, the exposure amount for the intermediate frame image MFR is controlled. As described above, the corrected frame image FR4C except the image-lost region ILR and the frame images FR1 to FR3 except image regions located in the same position as the moving region MVR in the corrected frame image FR4C and the moving region MVR are superimposed one upon another to generate the intermediate frame image MFR. Therefore, the intermediate frame image MFR includes an image region where pixel signals for four frames are not combined together.

For instance, in the intermediate frame image MFR, an image region located in the same position as the moving region MVR in the corrected frame image FR4C is composed only of the moving region MVR in the corrected frame image FR4C. Accordingly, each pixel signal of that image region in the intermediate frame image MFR is composed only of a pixel signal for one frame. Besides, in the intermediate frame image MFR, neither image region in the corrected frame image FR4C is used in an image region located in the same position as the image-lost region ILR in the corrected frame image FR4C. Accordingly, each pixel signal of that image region in the intermediate frame image MFR is composed only of pixel signal/signals for one, two or three frames. Therefore, the intermediate frame image MFR should be corrected such that all the pixel signals in the intermediate frame image MFR are each composed of pixel signals for four frames. Hereinafter, this correction method will be described in detail.

Figure 16:
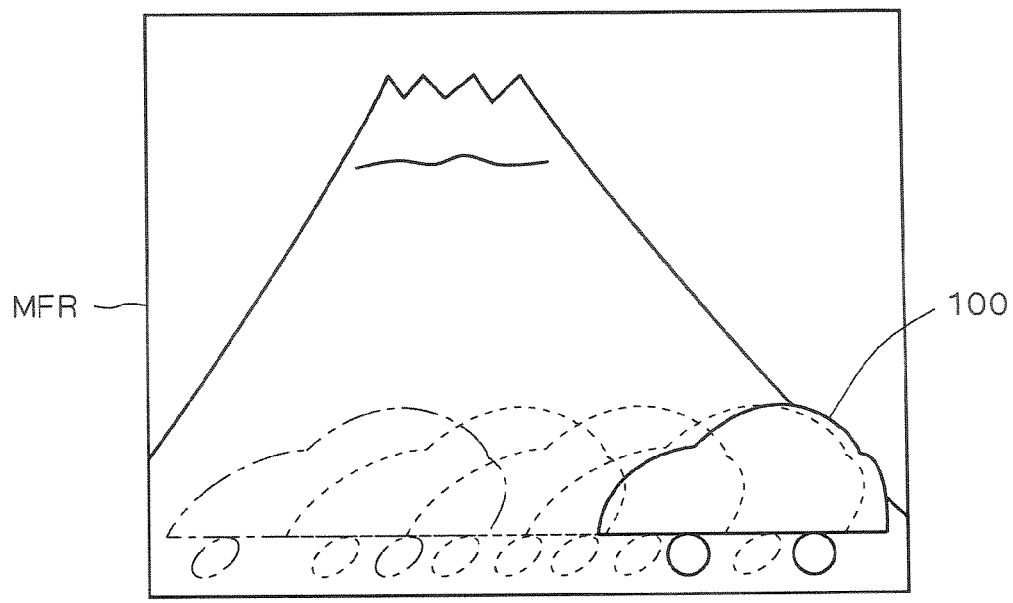
FIGS. 16 through 19 show the method of correcting an intermediate frame image according to the preferred embodiment of the invention.

As shown in FIG. 16, in the intermediate frame image MFR, giving attention to an image region 100 located in the same position as the moving region MVR in the corrected frame image FR4C, images of the moving regions MVR in the frame images FR1 to FR3 are superimposed upon the image region 100. Specifically, since the rolling shutter effect appearing in the moving regions MVR in the frame images FR1 to FR3 have not been corrected, the respective moving regions MVR in the frame images FR1 to FR3 are different in shape from the image region 100 in the intermediate frame image MFR. Accordingly, the moving-region correcting part 202 makes a correction of shifting pixels in each of the moving regions MVR in the frame images FR1 to FR3 in the opposite direction rmd to the moving direction md by the correction amount dr, to thereby correct the rolling shutter effect appearing in each of the moving regions MVR in the frame images FR1 to FR3. Then, the frame-image generating part 203 superimposes the respective corrected moving regions MVR in the frame images FR1 to FR3 upon the image region 100 in the intermediate frame image MFR. More specifically, each pixel signal in the image region 100 in the intermediate frame image MFR, each pixel signal in the corrected moving region MVR in the frame image FR1, each pixel signal in the corrected moving region MVR in the frame image FR2 and each pixel signal in the corrected moving region MVR in the frame image FR3 are combined in the same pixel position. Accordingly, the image region 100 in the intermediate frame image MFR is generated using the moving region MVR in the corrected frame image FR4C and moving regions MVR in the frame images FR1 to FR3, whereby each pixel signal in the image region 100 in the intermediate frame image MFR is composed of pixel signals for four frames. Generating the image region 100 by superimposing image regions one upon another in a plurality of frame images allows reduction in random noise appearing in image signals in image capturing. In the intermediate frame image MFR shown in FIG. 16 and FIGS. 17 to 19 which will be referred to later, an image region located in the same position as the image-lost region ILR in the corrected frame image FR4C is indicated by alternate long and short dashed lines, and image regions located in the same position as the moving regions MVR in the frame images FR1 to FR3 are indicated by broken lines, respectively.

Further, as described above, in the intermediate frame image MFR, since each pixel signal in an image region located in the same position as the image-lost region ILR in the corrected frame image FR4C is composed only of pixel signal/signals for one, two or three frames, each pixel signal in that image region is multiplied by L/K to be composed of pixel signals for four frames. Here, K is a value indicating how many frames a pixel signal of a to-be-corrected pixel covers.

Figure 17:
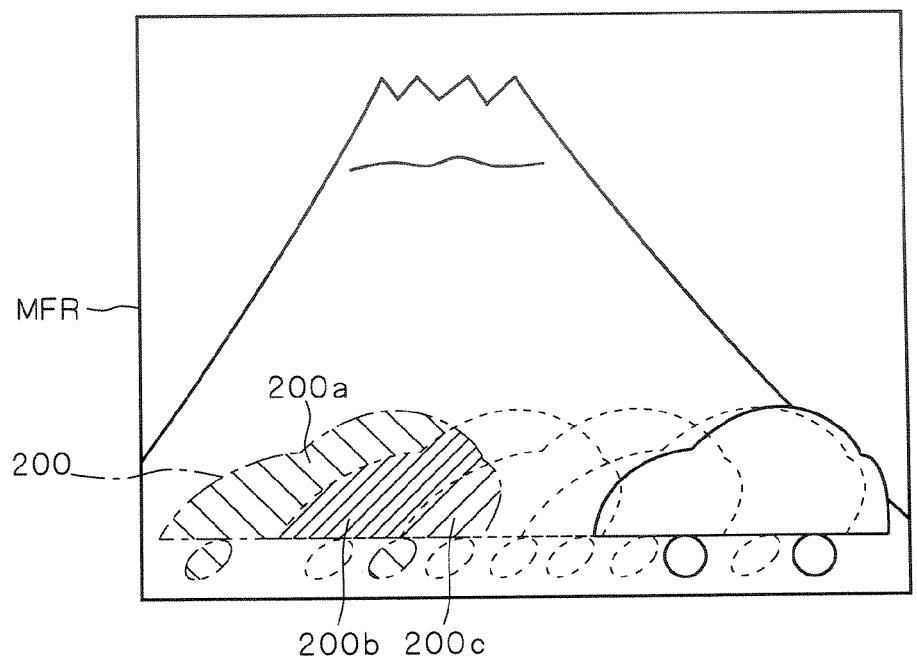

For instance, as shown in FIG. 17, in the intermediate frame image MFR, since a region 200a of an image region 200 (indicated by alternate long and short dashed lines) located in the same position as the image-lost region ILR in the corrected frame image FR4C is formed by superimposing thereupon image regions in the frame images FR1 to FR3 located in the same position as the region 200a, which means K=3. Each pixel signal in the region 200a is multiplied by 4/3 as L=4 in this example. A region 200b in the image region 200 is formed by superimposing thereupon image regions in the frame images FR1 and FR2 located in the same position as the region 200b, which means K=2. Accordingly, each pixel signal in the region 200b is multiplied by 4/2, i.e., doubled. A region 200c in the image region 200 is formed only by an image region in the frame image FR1 located in the same position as the region 200c, which means K=1. Accordingly, each pixel signal in the region 200c is multiplied by 4/1, i.e., quadrupled.

By correcting the image region 200 in the intermediate frame image MFR as described above, each pixel signal in the image region 200 is composed of pixel signals for four frames.

Figure 18:
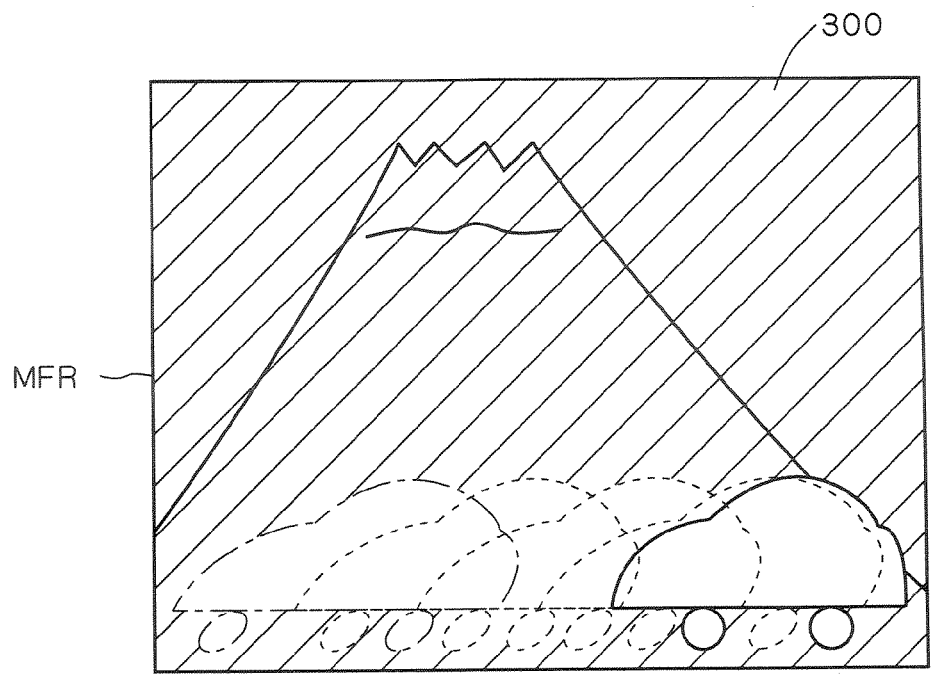
Figure 19:
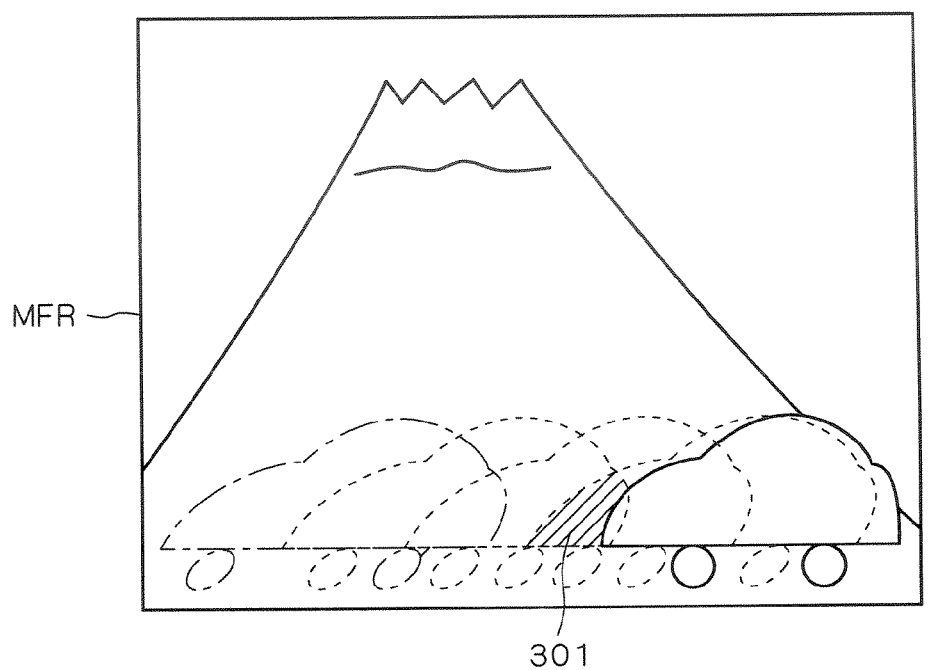

Furthermore, in the intermediate frame image MFR, since each pixel signal of an image region other than the aforementioned image regions 100 and 200 is composed of pixel signal/signals for one, two, three or four frames, each pixel signal of that image region is also multiplied by L/K. For instance, as shown in FIG. 18, a hatched region 300 in the intermediate frame image MFR is formed by superimposing thereupon image regions in the corrected frame image FR4C and the frame images FR1 to FR3 located in the same position as the region 300, which means K=4. Accordingly, each pixel signal in the region 300 is multiplied by 4/4, which is not changed. On the other hand, as shown in FIG. 19, a hatched region 301 in the intermediate frame image MFR is formed only by an image region located in the same position as the region 301 in the corrected frame image FR4C, which means K=1. Accordingly, each pixel signal in the region 301 is multiplied by 4/1, i.e., quadrupled.

Figure 20:
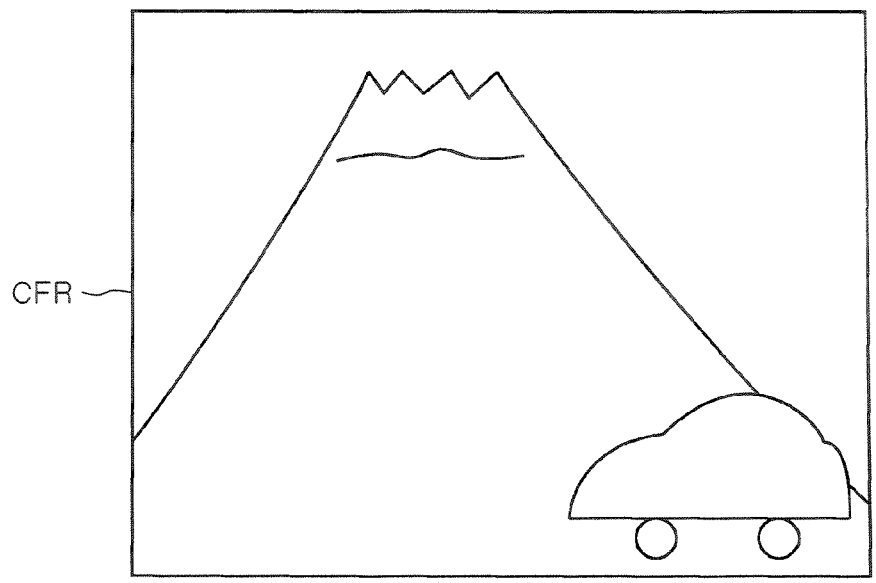
FIG. 20 shows a composite frame image according to the preferred embodiment of the invention.

The intermediate frame image MFR is thus corrected, and the corrected intermediate frame image MFR is defined as the composite frame image CFR. FIG. 20 shows the composite frame image CFR according to the present embodiment.

When the composite frame image CFR is generated in step s6, the composite image signal CDIS indicating its digital image signal DIS is stored in the memory 23. The RPU 21 reads out the composite image signal CDIS from the memory 23, and carries out various kinds of filtering such as sharpening on the composite image signal CDIS. Then, in step s7, the composite image signal CDIS having undergone the filtering is inputted to the display device 3, and the display device 3 displays an image on the basis of the composite image signal CDIS. The composite frame image CFR is thereby displayed as a stationary image.

Figure 21:
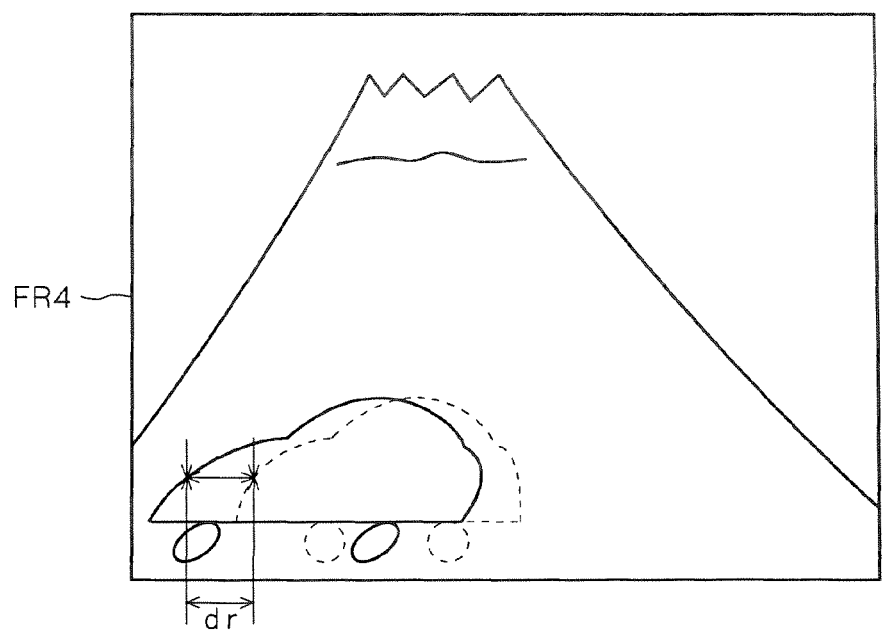
FIG. 21 shows a first modification of the method of correcting the moving region according to the preferred embodiment of the invention.
Figure 22:
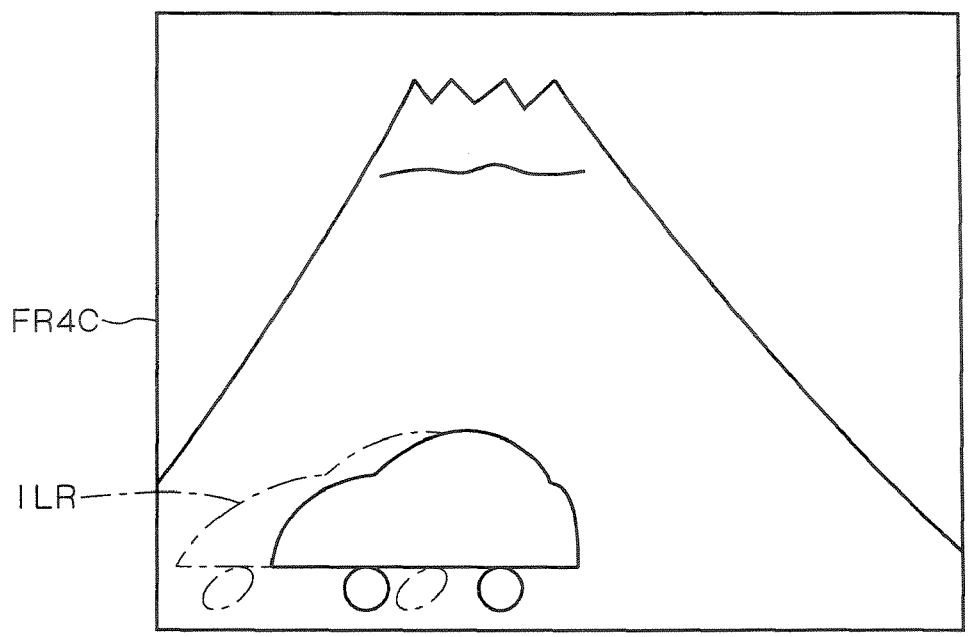
FIG. 22 shows a frame image corrected by the first modification.

In step s5 of the above example, each pixel in the moving region MVR is shifted in the opposite direction rmd to the moving direction md by (moving distance df+correction amount dr). Only in terms of correction of the rolling shutter correction, however, each pixel in the moving region MVR may be shifted in the opposite direction rmd only by the correction amount dr as shown in FIG. 21. Then, the rolling shutter effect appearing in the moving region MVR can be corrected as shown in FIG. 22 although the moving region MVR in the corrected frame image FR4C differs in position from the above example, so that an image distortion of a moving subject can be corrected. FIG. 21 indicates the corrected moving region MVR by broken lines, and FIG. 22 indicates the image-lost region ILR by alternate long and short dashed lines.

While the above example has been addressed to the method of correcting a frame image when capturing an image of a subject moving horizontally on the screen, the rolling shutter effect can also be corrected when capturing a subject moving vertically on the screen.

Figure 23:
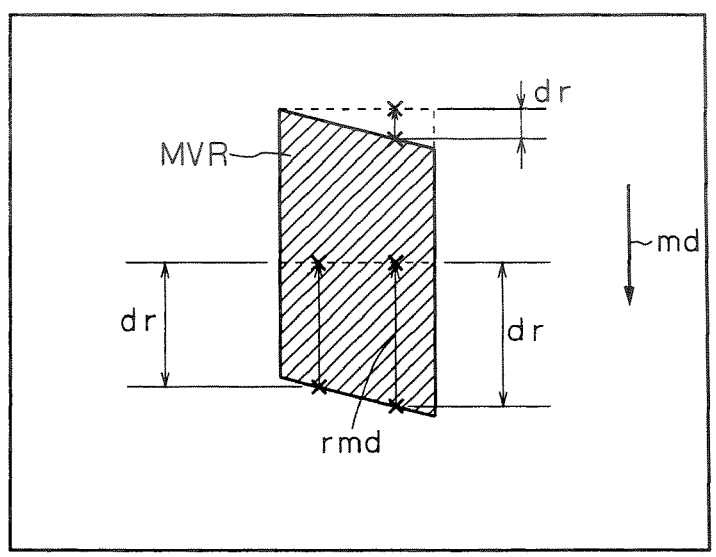
FIG. 23 shows a second modification of the method of correcting the moving region according to the preferred embodiment of the invention.
Figure 24:
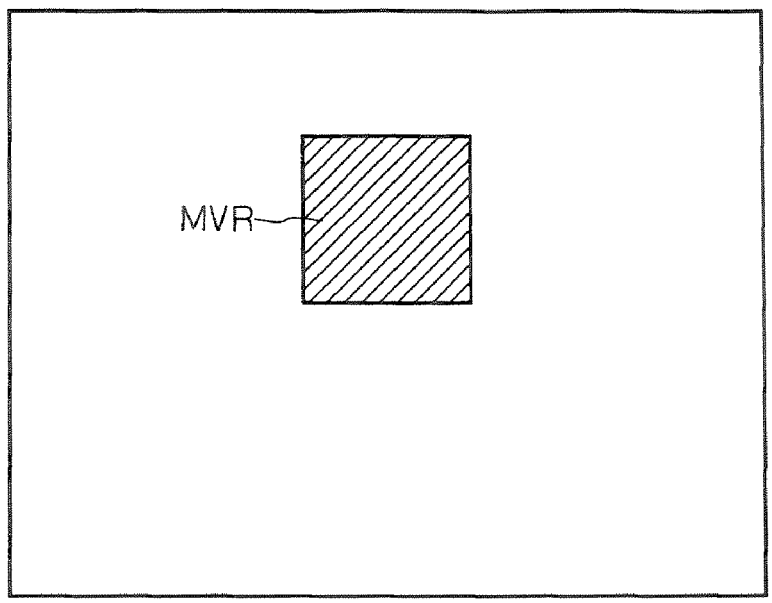
FIG. 24 shows a frame image corrected by the second modification.

For instance, when capturing an image of a square subject moving from top to bottom of the screen by the CMOS sensor 11, the image of the square subject will be vertically-long rectangle slightly deformed by the rolling shutter effect. Even in such case, shifting each pixel in the detected moving region MVR in the opposite direction rmd to the moving direction md of the moving region MVR by the correction amount dr as shown in FIG. 23 can correct the rolling shutter effect appearing in the moving region MVR as shown in FIG. 24, so that an image distortion of a moving subject can be corrected. In this case, the corrected moving region MVR is smaller in area than the moving region MVR before correction. Therefore, pixels in the moving region MVR are appropriately thinned out by bilinear or bicubic technique while shifting each pixel in the moving region MVR by the correction amount dr.

Figure 25:
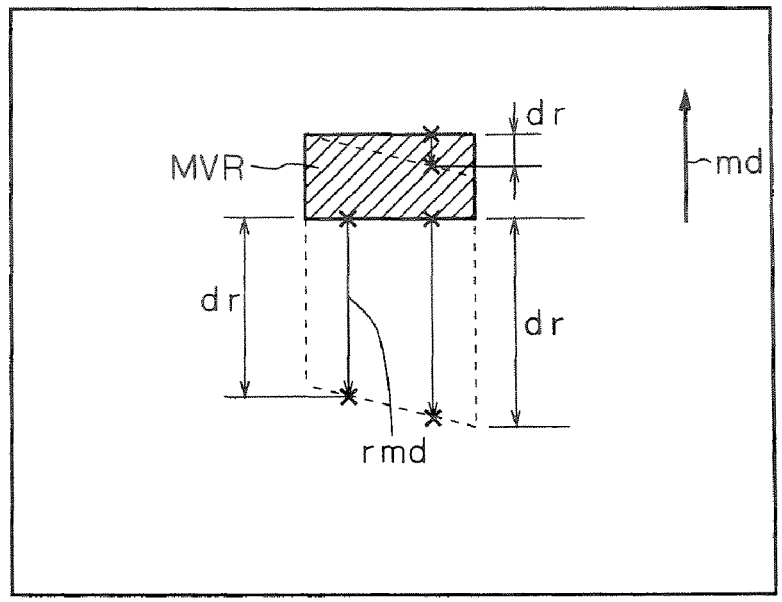
FIG. 25 shows a third modification of the method of correcting the moving region according to the preferred embodiment of the invention.
Figure 26:
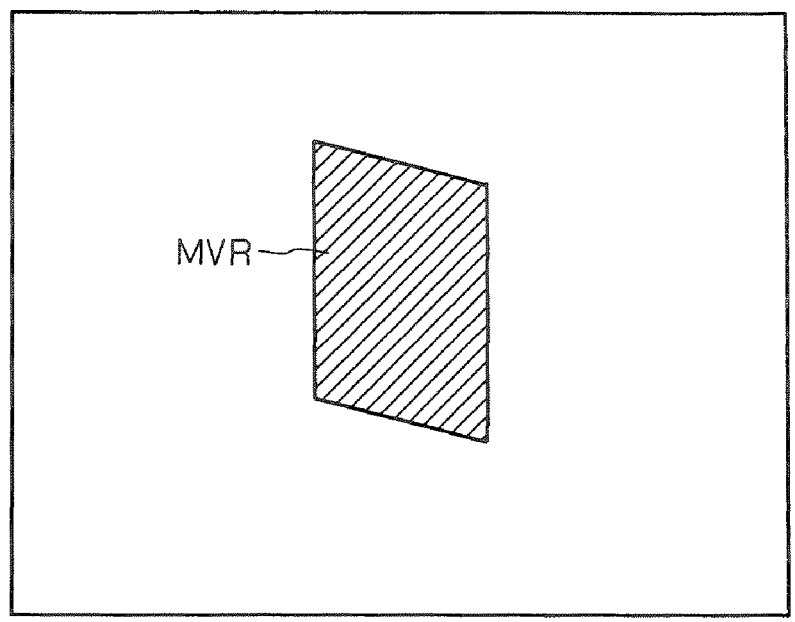
FIG. 26 shows a frame image corrected by the third modification.

When capturing an image of a rectangular subject moving from bottom to top of the screen by the CMOS sensor 11, the image of the rectangular subject is lengthwise shorter than actual size due to the rolling shutter effect. Even in such case, shifting each pixel in the detected moving region MVR in the opposite direction rmd to the moving direction md of the moving region MVR by the correction amount dr as shown in FIG. 25 can correct the rolling shutter effect appearing in the moving region MVR as shown in FIG. 26, so that an image distortion of a moving subject can be corrected. In this case, the corrected moving region MVR is larger in area than the moving region MVR before correction. Therefore, an area where no pixel is present in the corrected moving region MVR is appropriately interpolated using pixels around the area by bilinear or bicubic technique while shifting each pixel in the moving region MVR by the correction amount dr. It is needless to say that the rolling shutter effect can similarly be corrected when a subject is moving diagonally on the screen.

Since the CMOS sensor 11 starts exposure sequentially in the row direction (horizontally) on the screen, an image of a rectangular subject moving from bottom to top of the screen captured with the CMOS sensor 11 has top and bottom sides of the moving region MVR being parallel to the rows in the frame image as shown in FIG. 25, unlike a rectangular subject moving from top to bottom of the screen (in FIG. 23, the top and bottom sides of the moving region MVR are inclined relative to the rows). Accordingly, correcting the moving region MVR by the correction amount dr that varies between pixel positions causes the top and bottom sides of the moving region MVR to be inclined relative to the rows in a frame image as shown in FIG. 26, so that the corrected moving region MVR becomes slightly deformed rectangle although the subject is rectangle. While FIG. 26 shows the distortion in the corrected moving region MVR with exaggeration for ease of understanding of the present invention, the corrected moving region MVR actually does not have a distortion in such a degree as shown in FIG. 26 since the difference in exposure starting time is very small in one line. Accordingly, even when capturing an image of a subject moving from bottom to top of the screen by the CMOS sensor 11, an image distortion of the moving subject can be reduced significantly by correcting the moving region MVR by the correction amount dr.

As described, the image processor 2 according to the present embodiment corrects the moving region MVR in the frame image FR4 to be corrected on the basis of the motion vector of the detected moving region MVR, image-capturing time interval information, exposure-starting-time-difference information and exposure-start-sequence information, which achieves appropriate correction of an image distortion appearing in that moving region MVR caused by the rolling shutter type exposure. This in result can reduce an image distortion in the frame image FR4.

According to the present embodiment, the composite frame image CFR corresponding to a frame image captured during the total exposure time period is generated on the basis of the plurality of frame images FR1 to FR4 captured during short divided exposure time periods. This can reduce random noise occurring in image signals at image capturing.

In the composite frame image CFR generated by the frame-image generating part 203, the image region 200 located in the same position as the image-lost region ILR in the corrected frame image FR4C is generated on the basis of the remaining frame images FR1 to FR3 other than the corrected frame image FR4C. The image region 200 is thus generated with high fidelity to the subject.

In the composite frame image CFR, the image region 100 located in the same position as the moving region MVR in the corrected frame image FR4C is generated on the basis of the moving region MVR in the corrected frame image FR4C and moving regions MVR in the remaining frame images FR1 to FR3. The image region 100 is thus generated with high fidelity to the subject. This in result allows an image of a moving subject to be generated with high fidelity to the actual subject in the composite frame image CFR.

In the composite frame image CFR, images excluding the image region 200 located in the same position as the image-lost region ILR in the corrected frame image FR4C and the image region 100 located in the same position as the moving region MVR in the corrected frame image FR4C are generated on the basis of image regions other than the moving regions MVR located in the same position to one another in the corrected frame image FR4C and remaining frame images FR1 to FR3. This allows image regions other than the image regions 100 and 200 in the composite frame image CFR, such as the hatched regions 300, 301 and the like, to be generated with high fidelity to the subject.

While the present embodiment has been addressed to the camera system for displaying a stationary image, a motion picture can be displayed on the display device 3 on the basis of a plurality of composite frame images CFR generated by the frame-image generating part 203, which means the present invention is applicable to not only a digital still camera but also a digital video camera for displaying a motion picture. For instance, 4×15 frame images are sequentially captured. Of these captured frame images, defining sequentially-captured four frame images as a set of frame images, one composite frame image CFR is generated from each of fifteen sets of frame images. Sequentially displaying the fifteen composite frame images CFR thus generated in one second achieves motion picture display at a frame rate of 15 fps (frame/sec).

Displaying a motion picture on the basis of a plurality of composite frame images CFR as described above allows the motion picture to be displayed on the basis of frame images in which the rolling shutter effect has been corrected. This can provide a user with a motion picture that is easy to see, which is advantageous because the rolling shutter effect particularly in a motion picture gives great discomfort on a user.

Figure 27:
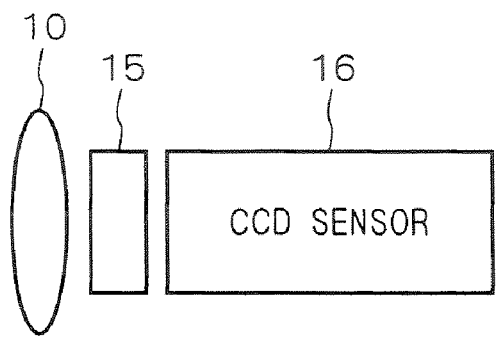
FIG. 27 is a block diagram showing a modification of the image capturing apparatus according to the invention.

Further, as shown in FIG. 27, replacing the CMOS sensor 11 in the image capturing apparatus 1 with a rolling shutter 15 which is a mechanical shutter and a CCD sensor 16 also causes the rolling shutter effect in frame images similarly when using the CMOS sensor 11 only. The present invention is also applicable when using such image capturing apparatus 1.

Generally, in the image capturing apparatus 1 including the rolling shutter 15 and CCD sensor 16, a horizontally long slit moves from top to bottom in front of an image-capturing screen of the CCD sensor 16 by the operation of the rolling shutter 15, thereby performing an exposure using light entering through the slit. Accordingly, the exposure starting time is the same in one line in one frame image, but varies between lines. Therefore, when using such image capturing apparatus 1, the rolling shutter effect appearing in the moving region MVR can be corrected by shifting respective pixels in the moving region MVR on a line-by-line basis, not on a pixel-by-pixel basis as in the above example. More specifically, the aforementioned correction amount dr is set at mv×q×std1, where std1 denotes the time difference in exposure starting time between lines, and q is a value indicating where in the sequence of exposures an exposure at a line to which to-be-corrected pixels in the moving region MVR belong starts, starting from the line where the first exposure is performed in the moving region MVR. Therefore, in this case, the correction amount dr for a plurality of pixels in one line is constant, and the correction amount dr for pixels belonging to the line where the first exposure is performed in the moving region MVR is zero. Further, the exposure-starting-time-difference information contains information on the time difference std1 in exposure starting time between lines, and exposure-start-sequence information contains information on exposure start sequence indicating exposure is performed in the order from the 1st row to the N-th row.

According to the present embodiment using the CMOS sensor 11, the moving region MVR is corrected on a pixelby-pixel basis, however, the moving region MVR may be corrected in a line-by-line basis even when using the CMOS sensor 11 since exposures start almost simultaneously in one line because of the aforementioned very small difference in exposure starting time between pixels in one line.

In this case, the correction amount dr is set at mv×r×std, where r is a value indicating where in the sequence of exposures the earliest exposure in a pixel position in the moving region MVR in a line to which to-be-corrected pixels belong starts, starting from the exposure in the aforementioned reference pixel position. For instance, in the case where M=1024 and one line contains 1024 pixels, let the reference pixel position be in the 2nd row and 2nd column, and, in the moving region MVR, the earliest exposure in a line to which a to-be-corrected (3, 10)th pixel belongs be performed on the (3, 2)th pixel. Then, r=1024. Since the value of r is constant between a plurality of pixels in one line, the correction amount dr is constant between the plurality of pixels in one line. The correction amount dr for a plurality of pixels in the line to which the pixel in the reference pixel position in the moving region MVR belongs is set at 0 by substituting 0 for r.

As described, it is not necessary to calculate the correction amount dr for each pixel when the moving region MVR is corrected on a line-by-line basis, unlike the aforementioned preferred embodiment. This reduces the amount of calculation for obtaining the correction amount dr.

While the invention has been shown and described in detail, the foregoing description is in all aspects illustrative and not restrictive. It is therefore understood that numerous modifications and variations can be devised without departing from the scope of the invention.

What is claimed is:

1. An image processor comprising:
   a motion detecting part configured to detect a moving region in each of a plurality of frame images captured by rolling shutter type exposure to obtain a motion vector of said moving region;
   a storing part configured to store
      image-capturing-time-interval information on an image-capturing time interval between said plurality of frame images,
      exposure-starting-time-difference information on an exposure starting time difference of the difference in position in one frame image caused by said rolling shutter type exposure, and
      exposure-start-sequence information on an exposure start sequence depending on the position in one frame image captured by said rolling shutter type exposure; and
   a moving-region correcting part configured to
      correct said moving region in a to-be-corrected frame image of said plurality of frame images based on
         said motion vector,
         said image-capturing-time-interval information,
         said exposure-starting-time-difference information, and
         said exposure-start-sequence information,
      obtain a moving speed of said moving region between said plurality of frame images based on said motion vector and image-capturing-time-interval information,
      determine a correction amount for each pixel in said moving region in said to-be-corrected frame image based on moving speed, exposure-starting-time-difference information and exposure-start-sequence information, and
      shift each pixel in said moving region in said to-be-corrected frame image in an opposite direction of a direction indicated by said motion vector by said correction amount to use each pixel instead of a pixel present in a destination pixel position.

2. A camera system comprising:
   an image capturing apparatus for capturing a plurality of frame images via rolling shutter type exposure; and
   an image processor including
      a motion detecting part configured to detect a moving region in each of a plurality of frame images captured by rolling shutter type exposure to obtain a motion vector of said moving region,
      a storing part configured to store
         image-capturing-time-interval information on an image-capturing time interval between said plurality of frame images,
         exposure-starting-time-difference information on an exposure starting time difference of the difference in position in one frame image caused by said rolling shutter type exposure, and
         exposure-start-sequence information on an exposure start sequence depending on the position in one frame image captured by said rolling shutter type exposure; and
      a moving-region correcting part configured to correct said moving region in a to-be-corrected frame image of said plurality of frame images based on
         said motion vector,
         said image-capturing-time-interval information,
         said exposure-starting-time-difference information, and
         said exposure-start-sequence information;
      an exposure-time determining part configured to determine an exposure time period in said image capturing apparatus and to divide said exposure time period by a same number as a number of said plurality of frame images to obtain divided exposure time periods, said image capturing apparatus capturing each of said plurality of frame images during a corresponding one of said divided exposure time periods; and
      a frame-image generating part configured to generate a composite frame image corresponding to a frame image captured during said exposure time period based on said to-be-corrected frame image in which said moving region has been corrected and a remaining frame image of said plurality of frame images.

3. The camera system according to claim 2, wherein said frame-image generating part generates, in said composite frame image, an image region located in a same position as a region where said corrected moving region in said to-be-corrected frame image has been located before correction based on an image region located in a position except said moving region in said remaining frame image.

4. The camera system according to claim 2, wherein said frame-image generating part generates, in said composite frame image, an image region located in a same position as said corrected moving region in said to-be-corrected frame image based on said corrected moving region in said to-be-corrected frame image and said moving region in said remaining frame image.

5. The camera system according to claim 2, wherein said frame-image generating part generates, in said composite frame image, an image region, except an image region located in a same position as a region where said corrected moving region in said to-be-corrected frame image has been located before correction and an image region located in a same position as said corrected moving region in said to-be-corrected frame image based on an image region, except said corrected moving region located in a same position in each to-be-corrected frame image and said remaining frame image.

6. The camera system according to claim 2, wherein said frame-image generating part generates, in said composite frame image,
an image region located in a same position as a region where said corrected moving region in said to-be-corrected frame image has been located before correction based on an image region located in a position except said moving region in said remaining frame image;
an image region located in a same position as said corrected moving region in said to-be-corrected frame image based on said corrected moving region in said to-be-corrected frame image and said moving region in said remaining frame image; and
an image region except an image region located in the same position as a region where said corrected moving region in said to-be-corrected frame image has been located before correction and an image region located in the same position as said corrected moving region in said to-be-corrected frame image based on an image region, except said corrected moving region located in a same position in each to-be corrected frame image and said remaining frame image.

7. The camera system according to claim 2, further comprising:
a display device configured to display a motion picture based on a plurality of composite frame images,
wherein said frame-image generating part generates said plurality of composite frame images.

* * * * *